(12) United States Patent
Tinnakornsrisuphap et al.

(10) Patent No.: US 8,179,811 B2
(45) Date of Patent: May 15, 2012

(54) DATA ATTACHMENT POINT SELECTION

(75) Inventors: Peerapol Tinnakornsrisuphap, San Diego, CA (US); Fatih Ulupinar, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 12/133,261

(22) Filed: Jun. 4, 2008

(65) Prior Publication Data

US 2009/0003242 A1    Jan. 1, 2009

Related U.S. Application Data

(60) Provisional application No. 60/942,964, filed on Jun. 8, 2007.

(51) Int. Cl.
*G01R 31/08* (2006.01)
*H04L 12/28* (2006.01)
*H04B 7/00* (2006.01)

(52) U.S. Cl. ............ 370/252; 370/255; 455/525

(58) Field of Classification Search ............ None
See application file for complete search history.

(56) References Cited

U.S. PATENT DOCUMENTS

| | | | |
|---|---|---|---|
| 6,894,994 B1 | 5/2005 | Grob et al. | |
| 7,120,136 B2 | 10/2006 | Upp et al. | |
| 7,450,582 B2 | 11/2008 | Suh et al. | |
| 2002/0102978 A1* | 8/2002 | Yahagi | 455/437 |
| 2002/0173310 A1* | 11/2002 | Ebata et al. | 455/445 |
| 2004/0009751 A1* | 1/2004 | Michaelis et al. | 455/62 |
| 2006/0018281 A1* | 1/2006 | Sadot et al. | 370/331 |

FOREIGN PATENT DOCUMENTS

| | | |
|---|---|---|
| EP | 1381200 | 1/2004 |
| JP | 2002345018 A | 11/2002 |
| JP | 2005086530 A | 3/2005 |
| JP | 2007142609 A | 6/2007 |
| JP | 2010524359 | 7/2010 |
| WO | 0133893 | 5/2001 |
| WO | WO2005060170 A1 | 6/2005 |

(Continued)

OTHER PUBLICATIONS

Route Control Plane for Ultra Mobile Broadband (UMB) Air Interface Specification Internet Citation, Feb. 1, 2007, pp. 1-31, XP002494029 [Retrieved on Feb. 1, 2007].

(Continued)

*Primary Examiner* — Ayaz Sheikh
*Assistant Examiner* — Sori Aga
(74) *Attorney, Agent, or Firm* — Francois Pelaez; Darren M. Simon

(57) ABSTRACT

An algorithm for improving efficiency of data attachment points (DAPs) in a wireless access network (AN) is provided herein. By way of example, the algorithm can identify a serving access point (APs) coupling an access terminal (AT) to the wireless AN. A cost metric for the serving AP can be determined with respect to at least one data network access gateway (AGW) of the wireless AN. The cost metric can be compared with a similar cost metric of a current or default DAP assigned to the AT. If the cost metric of the serving AP is lower than the cost metric of the current/default DAP, the DAP can be re-assigned to the serving AP, minimizing wireless AN resource costs associated with the DAP.

34 Claims, 13 Drawing Sheets

FOREIGN PATENT DOCUMENTS

WO  WO2007016326 A1  2/2007

OTHER PUBLICATIONS

International Search Repor—PCT/US2008/066209 International Search Authority—European Patent Office—Nov. 6, 2008.
Written Opinion—PCT/US2008/066209, International Search Authority—European Patent Office—Nov. 6, 2008.

3GPP TS 23.401 V8.1.0 (Mar. 2008), 3rd Generation Partnership Project; Technical Specification Group Services and System Aspects; General Packet Radio Service (GPRS) enhancements for Evolved Universal Terrestrial Radio Access Network (E-UTRAN) access (Release 8); Section 5.5.1, p. 1-10 and 87-94.
Airvana et al., "UMB Data Attachment Point Handoff call flow," 3GPP2 TSG-A, A40-20070314, Mar. 2007.

\* cited by examiner

DATA ATTACHMENT POINT SELECTION

CLAIM OF PRIORITY UNDER 35 U.S.C. §119

The present Application for Patent claims priority to Provisional Application No. 60/942,964 entitled DISTRIBUTED DATA ATTACHMENT POINT (DAP) SELECTION filed Jun. 8, 2007, and assigned to the assignee hereof and hereby expressly incorporated by reference herein.

BACKGROUND

I. Field

The following relates generally to wireless communication, and more specifically to determining an efficient data attachment point (DAP) for access terminals in a wireless access network.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

A modern radio access network (RAN) comprising one or more wireless access points (APs) (e.g., including a base station [BS], evolved-base station [eBS], wireless node, and so on) can serve as an interface to circuit-switched communication networks and/or packet-switched communication networks. For packet-switched networks, such as an ultra mobile broadband (UMB) network, a mobile device can communicate wirelessly with a packet-switched backbone network, such as an Internet Protocol (IP)-based network like the Internet or an intranet, via the wireless APs (e.g., an eBS). In such case, the wireless AP can serve as a data attachment point (DAP) through which an IP network access gateway (AGW) of the backbone network routes data to the mobile device.

In a mobile environment, however, the mobile device can move from one geographic location to another. Thus, the mobile device is typically configured to wirelessly access communication networks (e.g., circuit-switched core networks, packet-switched core networks, the Internet, etc.) through multiple disparate wireless access points. Further, in order to maintain a communication as the mobile device communicates with, or attaches to/registers with, different base stations, the DAP may have to be adjusted to accommodate data flow to and from the mobile device as it moves from location to location. As an example, where a call is initiated in Montreal Canada, and a mobile device maintains the call while traveling to Miami, Fla., the DAP typically will be adjusted to various access points along the traveling route. It could be very inefficient, or in some cases impossible, to maintain a DAP in Montreal for the mobile device that arrives in Miami. Accordingly, a network will need to update a DAP of a mobile device and/or data communication as the device moves away from a previous DAP.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides a method and apparatus for improving efficiency with respect to establishing or updating a data attachment point (DAP) in a wireless access network (AN). An algorithm can identify access points (APs) of a particular wireless access network (AN) and further identify one or more access gateways (AGWS) to a data network. A cost metric for a plurality of the APs can be determined to at least one AGW. In at least one aspect, the plurality of APs comprises at least a serving AP for an access terminal (AT) and a current or default data AP. As utilized herein, the data AP is an access point to which the AGWs can route downlink data packets for the AT (e.g., a data attachment point [DAP]). In at least one instance of such aspects, an AGW that provides a lowest cost metric for the serving AP is determined. The lowest cost metric is compared with a cost metric of the data AP, also with respect to such AGW. If the cost metric of the serving AP is lower than the cost metric of the data AP, the serving AP can be updated to act as the data AP for the AT. Otherwise, the data AP is maintained at the current/default AP.

In at least one aspect of the disclosure, provided is a method of selecting a DAP for a wireless AN. The method can comprise establishing a resource cost for at least two wireless access points (APs) of the wireless AN and comparing a resource cost of a serving AP to a resource cost of a current or default DAP. The method can further comprise establishing the serving AP as the DAP based at least in part on the comparison.

According to other aspects, disclosed is an apparatus that determines a DAP for a wireless AN. The apparatus can comprise an analysis module that establishes a cost metric for wireless APs of the wireless AN with respect to at least one Internet Protocol (IP) gateway. The apparatus can further comprise a measurement module that compares a cost metric of a serving AP to a cost metric of a current DAP. In addition, the apparatus can comprise an attachment module that establishes the serving AP as the DAP based at least in part on the comparison.

In still other aspects, disclosed is an apparatus that determines a DAP for a wireless AN. The apparatus can comprise means for establishing a resource cost for at least two wireless APs of the wireless AN and means for comparing a resource cost of a serving AP to a resource cost of a current or default DAP. The apparatus can further comprise means for establishing the serving AP as the DAP based at least in part on the comparison.

In addition to the foregoing, provided is a processor configured to determine a DAP for a wireless AN. The processor can comprise a first module that establishes a resource cost for at least two wireless APs of the wireless AN and a second module that compares a resource cost of a serving AP to a resource cost of a current or default DAP. The processor can additionally comprise a third module that establishes the serving AP as the DAP based at least in part on the comparison.

According to further aspects, provided is a computer-readable medium comprising computer-readable instructions configured to determine a DAP for a wireless AN. The instructions are executable by at least one computer to establish a resource cost for at least two wireless access points (APs) of the wireless AN and to compare a resource cost of a serving AP to a resource cost of a current or default DAP. In addition, the instructions are executable by the at least one computer to establish the serving AP as the DAP based at least in part on the comparison.

According to additional aspects, disclosed is a method for facilitating selection of a DAP for a wireless AN. The method can comprise registering for data communication with an AP of the wireless AN and obtaining a cost metric associated with the AP, the cost metric is relative to an IP gateway. Furthermore, the method can comprise facilitating establishment of or switching a DAP of an AT based at least in part on the cost metric.

Additionally, aspects of the subject disclosure provide an AT that facilitates selection of a DAP for wireless AN. The AT can comprise a controller that registers for data communication with an AP of the wireless AN and a receive circuit that obtains a cost metric associated with the AP, the cost metric is relative an IP gateway. Furthermore, the AT can comprise a processing circuit that facilitates establishment of or switching a DAP of an AT based at least in part on the cost metric.

According to other aspects, disclosed is an apparatus configured to facilitate selection of a DAP in a wireless AN. The apparatus can comprise means for registering for data communication with an AP of the wireless AN and means for obtaining a cost metric associated with the AP, the cost metric is relative an IP gateway. The apparatus can further comprise means for facilitating establishment of or switching a DAP of an AT based at least in part on the cost metric.

According to still other aspects, disclosed is a processor configured to facilitate selection of a DAP in a wireless AN. The processor can comprise a first module that registers for data communication with an AP of the wireless AN and a second module that obtains a cost metric associated with the AP, the cost metric is relative an IP gateway. The processor can further comprise a third module that facilitates establishment of or switching a DAP of an AT based at least in part on the cost metric.

In at least one or more further aspects, provided is a computer-readable medium comprising computer-readable instructions configured to facilitate selection of a DAP in a wireless AN. The instructions can be executable by at least one computer to register for data communication with an AP of the wireless AN and to obtain a cost metric associated with the AP, the cost metric is relative an IP gateway. The instructions can be further executable by the at least one computer to facilitate establishment of or switching a DAP of an AT based at least in part on the cost metric.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
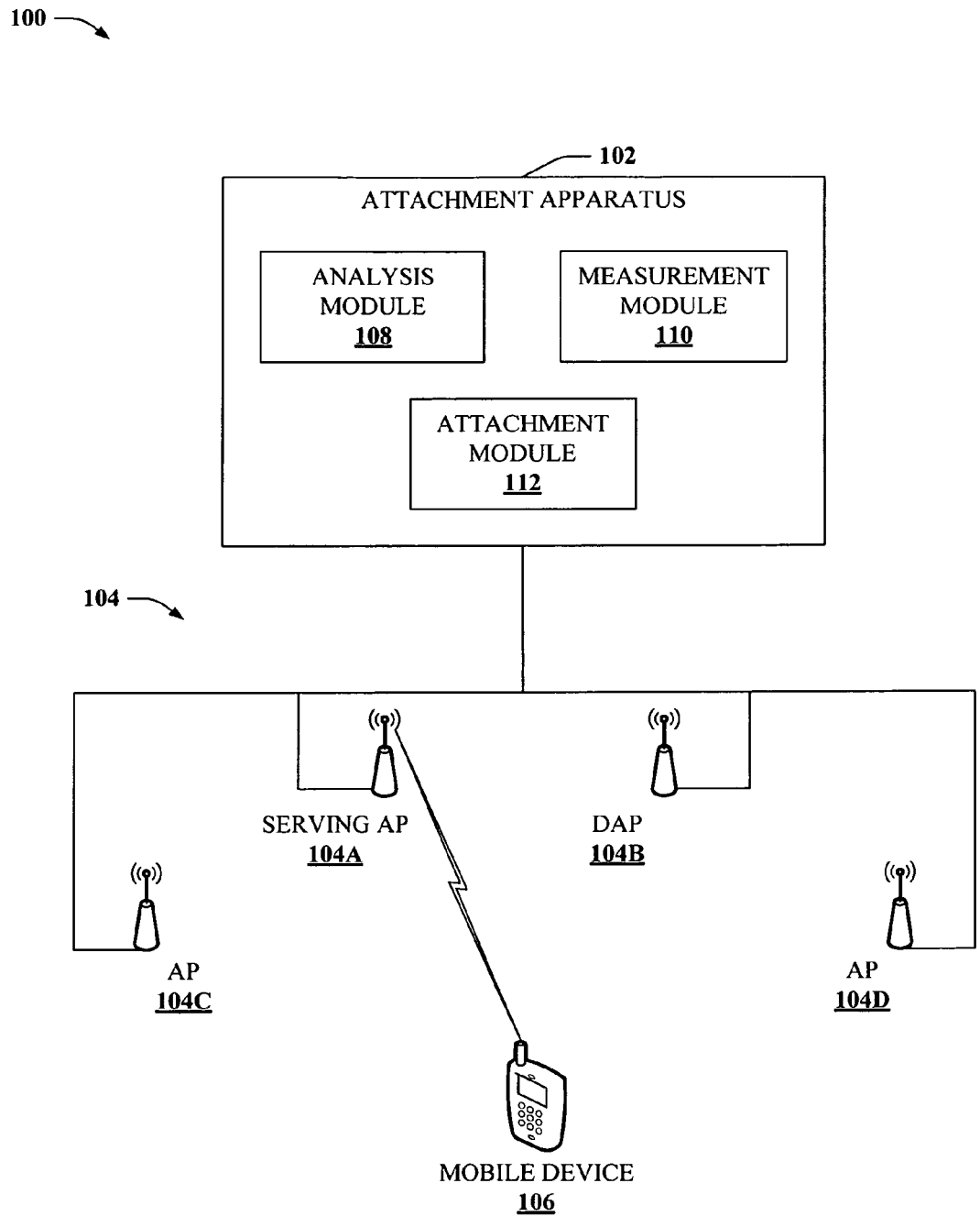
FIG. 1 illustrates a block diagram of an example system that selects a data attachment point (DAP) for a wireless access network (AN).

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of determining a RUM accumulation rate for one or more sectors of a mobile site based on a performance metric of multiple sectors. One skilled in the art should appreciate that similar techniques could apply to other communication environments.

The subject disclosure provides efficient algorithms for establishing a data attachment point (DAP) in a wireless access network (AN) and/or switching a DAP to another wireless access point (AP) of the wireless AN. In the case of an ultra mobile broadband (UMB) network, the DAP can be an evolved base station (eBS) that is used as a data proxy for an access terminal (AT) (e.g., a mobile device). The DAP, as utilized in the subject disclosure and appended claims, is defined as any suitable wireless AP to which a data network access gateway (AGW) can route downlink data packets for delivery to ATs coupled to the wireless AN. Thus, in one particular non-limiting example, the AGW can provide Internet Protocol (IP) data packets from the Internet to the AT, and vice versa, via an AP (e.g., an eBS) that serves as the DAP for the mobile device. It should be appreciated that data communication is not limited to IP data packets, but can comprise any suitable data communication between devices. Thus, where the subject disclosure and appended claims specify an IP data packet, an IP AGW, an IP interface, or the like, it is to be understood that the term "IP" is a non-limiting example of data communication in general, and such term includes any suitable data communication between devices. It should also be appreciated that the subject matter disclosed herein is applicable to various types of mobile networks in addition to the UMB network. Examples can include code division multiple access (CDMA) networks, time division multiple access (TDMA) networks, frequency division multiple access (FDMA) networks, orthogonal frequency division multiple access (OFDMA) networks, and so forth.

According to various network requirements (e.g., UMB standards), a serving AP (e.g., which wirelessly couples with an AT to facilitate wireless communication between the AT and one or more networks) can be a different access point from the DAP discussed above. In a UMB network, for instance, as well as other networks, this scenario can enable fast L2 switching for the AT between eBSs. In such case, the DAP typically tunnels data communication addressed to the AT to the serving AP. However, enabling the DAP to be at a different AP than the serving AP can lead to inefficient use of network bandwidth, data rates and/or other AN resources. In a simple topology (e.g., where all APs connect to a single aggregation router), it can typically be most efficient to establish the serving AP as the DAP. However, in a more complex topology (e.g., where one or more APs are coupled with the router by way of communication with other APs) it may not always be most efficient to change the DAP from a current or default AP to the serving AP. Accordingly, the disclosed algorithms provide, in at least one aspect, a mechanism to efficiently determine choice of DAP for a generic AN (e.g., simple topology, complex topology, etc.).

In at least one aspect of the disclosure, the decision whether to establish or switch the DAP as/to the serving AP is distributed among APs of an AN. Such architecture can integrate efficiently into simple topology and complex topology ANs of various technologies (e.g., UMB). Furthermore, such architecture can reduce delay and complexity associated with involving a central entity (e.g., a radio network controller [RNC]) in some cases. The DAP decision can automatically adapt to a current topology without substantial re-configuration.

According to one or more other aspects, the selection of AP for the DAP can be maintained at a central entity serving an AN. In some AN configurations, the central entity can be more efficient (e.g., where rapid and/or high bandwidth communication between the APs and central entity exists). Managing decisions at a central entity can reduce discovery time associated with topology changes to the AN. In at least some aspects, a central entity can be utilized in conjunction with distributed DAP selection. For instance, data pertinent to cost metrics of each AP and current DAP locations can be maintained at a central entity. Further, changes in AN topology can be maintained at the central entity as well. APs can both update the central entity with information pertinent to a particular AP (e.g., resource cost to one or more AGWs) as well as extract information pertinent to other APs of the AN. Thus, decisions can be made in a distributed fashion based on AN data stored at a common entity.

In accordance with one or more additional aspects, an AT can facilitate determination of DAP for the AT and/or other ATs. For instance, an AT registered for communication with an AP of the AN (e.g., at a serving AP) can obtain cost metric information pertaining to the serving AP, a current or default DAP, and/or other APs of the AN. A comparison of cost metrics associated with such APs and/or DAP, relative to one or more selected AGWs, can be performed at the AT. A result of the comparison can be utilized to establish an AP as a DAP or switch a current/default DAP to another AP of the AN. The AT can obtain cost metric information via wireless communication with various entities, including the serving AP, the DAP, other APs of the AN, a centralized server/data store (e.g., via one or more APs of the AN or by direct wireless communication with the centralized server/data store where suitable), and forward results of cost metric comparisons in similar manner.

As used in the subject disclosure, the terms "component," "system," "module" and the like are intended to refer to a computer-related entity, either hardware, software, software in execution, firmware, middle ware, microcode, and/or any combination thereof For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with an access terminal—AT. An AT can also be called a system, a subscriber unit, a subscriber station, mobile station, mobile, mobile communication device, mobile device, remote station, remote terminal, user terminal (UT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates a block diagram of an example system 100 that selects an AP (104A, 104B, 104C, 104D) of a wireless AN 104 to be a DAP (104B) for a AT 106 coupled to the AN 104. For instance, an attachment apparatus 102 can determine whether to establish or move a DAP (104B) to a serving AP (104A) of the AT 106. System 100 can account for complex or simple AP topologies as well as single or multiple AGWs (not depicted) providing data communication for the AN 104. Accordingly, system 100 can provide improved efficiency and overhead reduction in establishing DAPs for the AN 104.

In a wireless environment, AT 106 is mobile and therefore can move from one location to another. As such, the AT can communicatively couple with various APs 104A, 104B, 104C, 104D of AN 104, or of other ANs, to access a mobile network, a circuit-switched voice network, a data packet network such as the Internet, or a combination thereof or of the like. As depicted, AP 104A is currently a serving AP for the AT 106. If AT 106 moves away from the current serving AP 104A toward another AP (104C), the AT 106 can begin communicating with the other AP (104C) and cease communicating with the original serving AP 104A. Accordingly, such other AP 104C will become the serving AP for AT 106. Data from an AGW, however, can still be sent to the current DAP 104B. One reason for the foregoing is that, depending on the mobility of the AT 106, it can be possible that AP 104A will again become the serving AP for the AT 106, or another suitable AP (e.g., AP 104B) will become the serving AP. Thus, switching the DAP from one AP (104A) to another (e.g., 104C) can be delayed until the serving AP (e.g., 104A)

is established for a threshold time. Waiting for the serving AP to become stable can avoid ping-pong movement of the DAP.

In a simple topology, where each AP (104A, 104B, 104C, 104D) is directly connected to an AGW or a single aggregation router, it is typically most efficient for the serving AP (104A) to be the DAP (104B) for an AT 106, once it is likely the serving AP (104A) will continue to serve the AT 106 for a significant period of time. Thus, a threshold time can be a significant factor in determining whether to move a DAP (104B) to a current serving AP (104A) in a simple topology.

In a complex topology, however, where one or more APs (104A, 104B, 104C, 104D) are coupled with the AGW(s) by way of other APs (104A, 104B, 104C, 104D) or like connection points (e.g., a backhaul network, a wireless backhaul, etc.), maintaining the DAP 104B at a concurrent or default AP (104B) can be more efficient. In such case, it can be more efficient to make the serving AP (104A) the DAP (104B) to reduce network resources associated with routing data communication through the AN 104 to the AT 106. Switching a DAP 104B to another AP (104A, 104B, 104C, 104D) can be based on various criteria. As discussed above with respect to the simple topology, the selection/switch can be based at least in part on a period of time that the AT 106 communicates with the serving AP 104A. Other criteria can include dynamic resource metrics of the AN 104. Such resource metrics can comprise bandwidth, data rate, hop count to an AGW, weighted topological distance to an AGW, pilot strength of one or more APs, or latency and traffic load of an AP, or a like criteria or a combination thereof.

It should be appreciated that switching a DAP 104B to another AP (104A, 104B, 104C, 104D) can be AT 106 assisted and/or AN 104 initiated. In the former case, selection of an AP (104A, 104B, 104C, 104D) to become the DAP 104B can be based at least in part on a pilot strength of APs seen by the AT 106, for instance. In the latter case, selection of AP (104A, 104B, 104C, 104D) to serve as the DAP 104B can be based on whether or not the current DAP (104B) is the serving AP (104A) for the AT 106.

In one particular aspect, attachment apparatus 102 can be situated at a central controller of the AN 104 (not depicted), at one or more APs 104A, 104B, 104C, 104D of the AN 104 and/or at the AT 106. Attachment apparatus can comprise an analysis module 108 that establishes a cost metric for wireless APs 104A, 104B, 104C, 104D of the wireless AN 104. The cost metric can be established for at least two APs (e.g., serving AP 104A and DAP 104B) with respect to at least one IP AGW (not depicted, but see AGW 208 at FIG. 2, infra). Attachment apparatus 102 can further comprise a measurement module 110. Measurement module 110 can compare the cost metric of one or more APs 104A, 104B, 104C, 104D against cost metric(s) of other APs 104A, 104B, 104C, 104D in conjunction with establishing a DAP (104B) or switching a DAP (104B) to another AP 104A, 104B, 104C, 104D, such as serving AP (104A). Thus, measurement component 110 can compare a cost metric(s) of serving AP 104A to a cost metric(s) of a current or default DAP 104B in at least some aspects of the subject disclosure.

In addition to the foregoing, attachment apparatus 102 can comprise an attachment module 112. Attachment module 112 can establish a DAP 104B as one of the APs 104A, 104B, 104C, 104D of the wireless AN 104. Establishment of the DAP 104B can be based at least in part on a comparison conducted at measurement module 110. In at least one particular aspect, attachment module 112 can switch a DAP 104B from a current or default AP (104B) to a serving AP 104A based at least in part on a comparison of a cost metric of the serving AP 104A and the current/default DAP/AP 104B.

Thus, according to such aspects for instance, where the cost metric of the serving AP 104A is lower than the cost metric for the current/default DAP 104B, the DAP 104B can be moved from the current/default AP (104B) to the serving AP 104A.

According to one or more particular aspects of the disclosure, system 100 can comprise an inter-AP link (104) between APs (104A, 104B, 104C, 104D) of the wireless AN 104. The inter-AP link (104) can comprise a backhaul link in some such aspects. For instance, an ad-hoc or centralized wired and/or wireless connection between APs (104A, 104B, 104C, 104D) can form the inter-AP link (104). Such link (104) can be utilized to share cost metric data among APs (104A, 104B, 104C, 104D), facilitating distributed DAP (104B) selection where the attachment apparatus 102 is maintained at least in part at one or more APs (104A, 104B, 104C, 104D) of the wireless AN.

Figure 6:
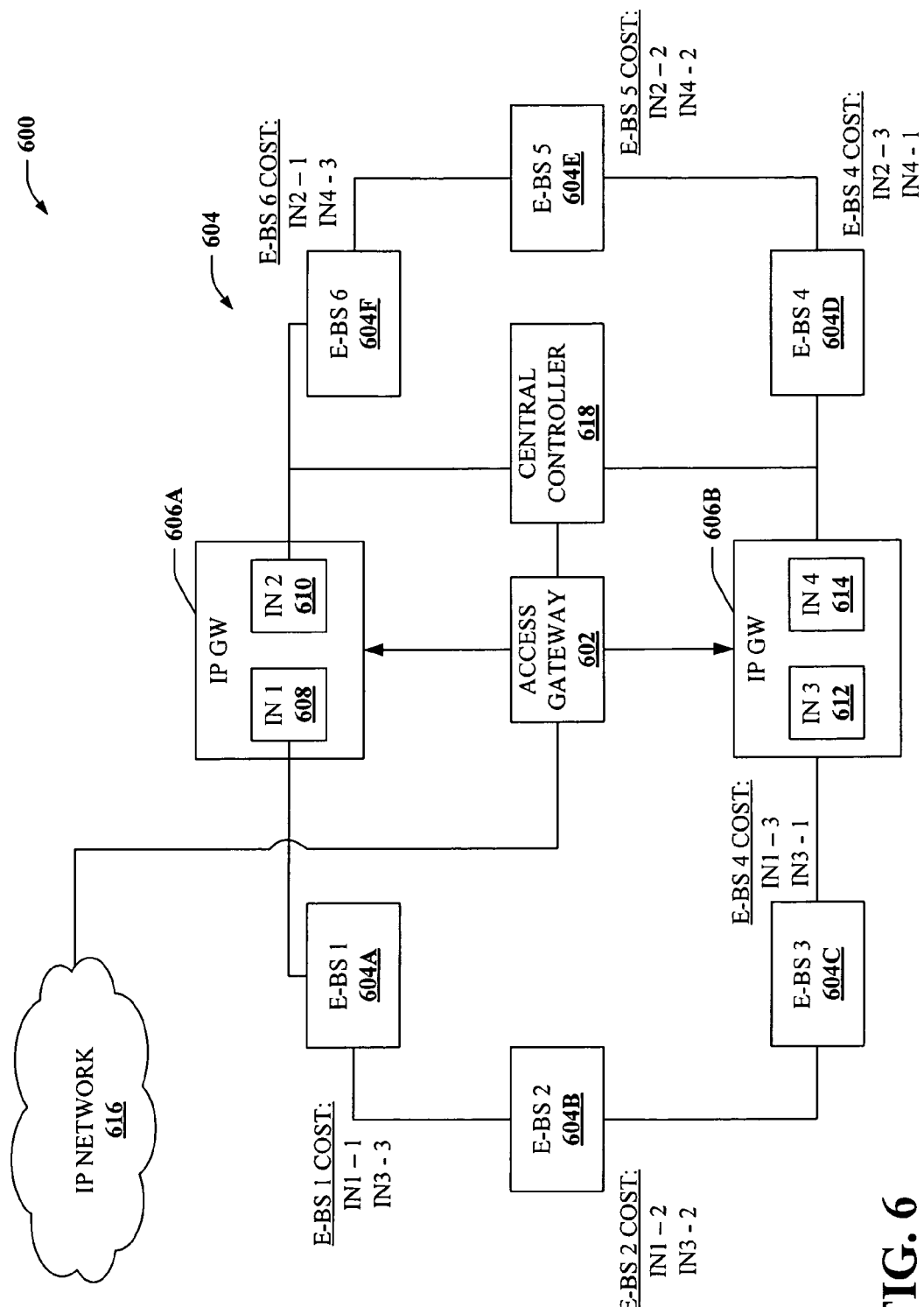
FIG. 6 illustrates a block diagram of a further example DAP selection based on a DAP selection algorithm(s).
Figure 7:
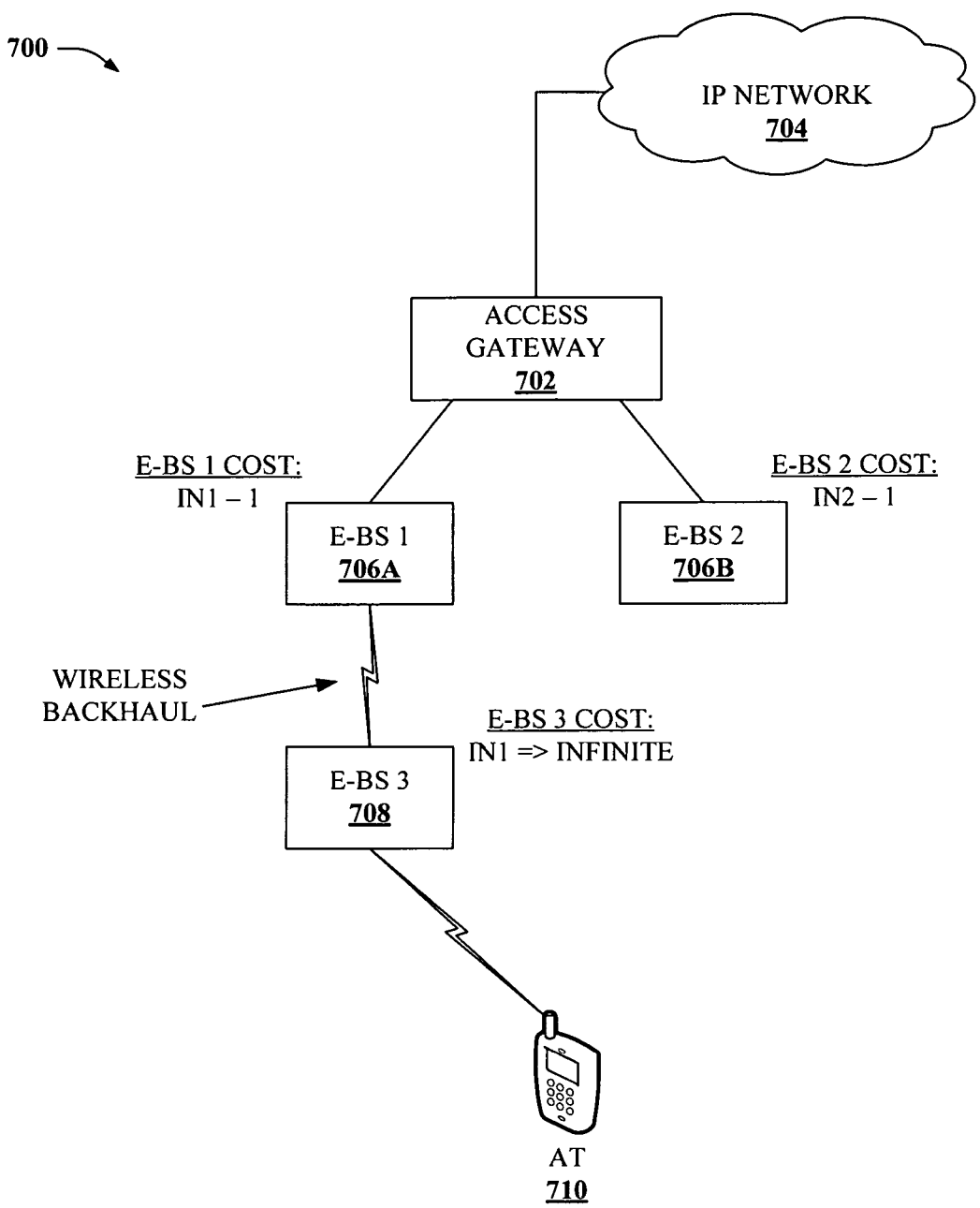
FIG. 7 illustrates a block diagram of an additional example DAP selection based on a DAP selection algorithm(s).

According to one or more alternative or additional aspects, analysis module 108 can determine a hop count for each of at least two APs (104A, 104B, 104C, 104D), such as DAP 104B and serving AP 104A, with respect to each of multiple AGWs (e.g., see FIG. 6, infra). The analysis module 108 can determine or obtain which of the multiple AGWs provides the smallest hop count to one of the at least two APs (e.g., serving AP 104A). Furthermore, the analysis module 108 can obtain the hop count of the DAP 104B to the AGW that provides the lowest hop count to the one AP (e.g., 104A). In such aspects, measurement module 110 can compare the hop count of the DAP 104B with the hop count of the one AP (e.g., 104A) and determine which hop count is lower. The attachment module 112 can switch the DAP 104B to the one AP (e.g., 104A) if the hop count to the one AP (e.g., 104A) is lower hop based on the comparison.

It should also be appreciated that system 100 can comprise multiple ATs (106) as well as multiple APs (104A, 104B, 104C, 104D). An AP 104A, 104B, 104C, 104D is generally a fixed station that communicates with the AT(s) 106 and can also be called an eBS, a Node B, or some other terminology. Each AP 104A, 104B, 104C, 104D provides communication coverage for a particular geographic area or coverage area (not depicted), referred to as a cell. It should also be appreciated that the term "cell" can refer to an AP 104A, 104B, 104C, 104D and/or its coverage area depending on the context in which the term is used.

ATs 106 are typically dispersed throughout system 100, and each AT 106 can be either fixed or mobile. AT 106 can also be called a mobile station, user equipment, a user device, or some other technology, as discussed above. An AT 106 can be a wireless device, a cellular phone, a personal digital assistant (PDA), a wireless modem card, and so on. Further, AT 106 can communicate with zero, one or multiple APs 104A, 104B, 104C, 104D on the downlink and uplink at any suitable moment. The downlink (or forward link) refers to the communication link from the APs 104A, 104B, 104C, 104D to the AT 106, and the uplink (or reverse link) refers to the communication link from the AT 106 to the APs 104A, 104B, 104C, 104D. As used herein and briefly discussed above, an AP 104A, 104B, 104C, 104D with which an AT 106 maintains an active communication or an active registration is termed a "serving AP" 104A.

In addition to the foregoing, an AN such as depicted by system 100 can comprise a centralized architecture or a distributed architecture, or some suitable combination thereof For a centralized architecture, a system controller (not depicted, but see central controller 618 at FIG. 6, infra) can couple to APs 104A, 104B, 104C, 104D and provide coordination, control and/or common data storage for APs 104A, 104B, 104C, 104D. For instance, as discussed herein, the system controller can facilitate obtaining resource and/or cost metric data for multiple APs 104A, 104B, 104C, 104D, aggregate the data, discover changes in network topology, update resource/cost metrics of various APs 104A, 104B, 104C, 104D, determine DAP (104B) selection or switching, and/or provide data to other APs 104A, 104B, 104C, 104D or AT 106 to facilitate DAP (104B) selection or switching at such entities 104A, 104B, 104C, 104D, 106. For a distributed architecture, APs 104A, 104B, 104C, 104D can communicate with one another as needed (e.g., employing a backhaul network, not depicted). Data transmission on the forward link often occurs from one AP 104A, 104B, 104C, 104D to an AT 106 at or near the maximum data rate that can be supported by the forward link and/or the communication system. Additional channels of the forward link (e.g., control channel) can be transmitted from multiple APs 104A, 104B, 104C, 104D to one AT 106. Reverse link data communication can occur from one AT 106 to one or more APs 104A, 104B, 104C, 104D.

Figure 2:
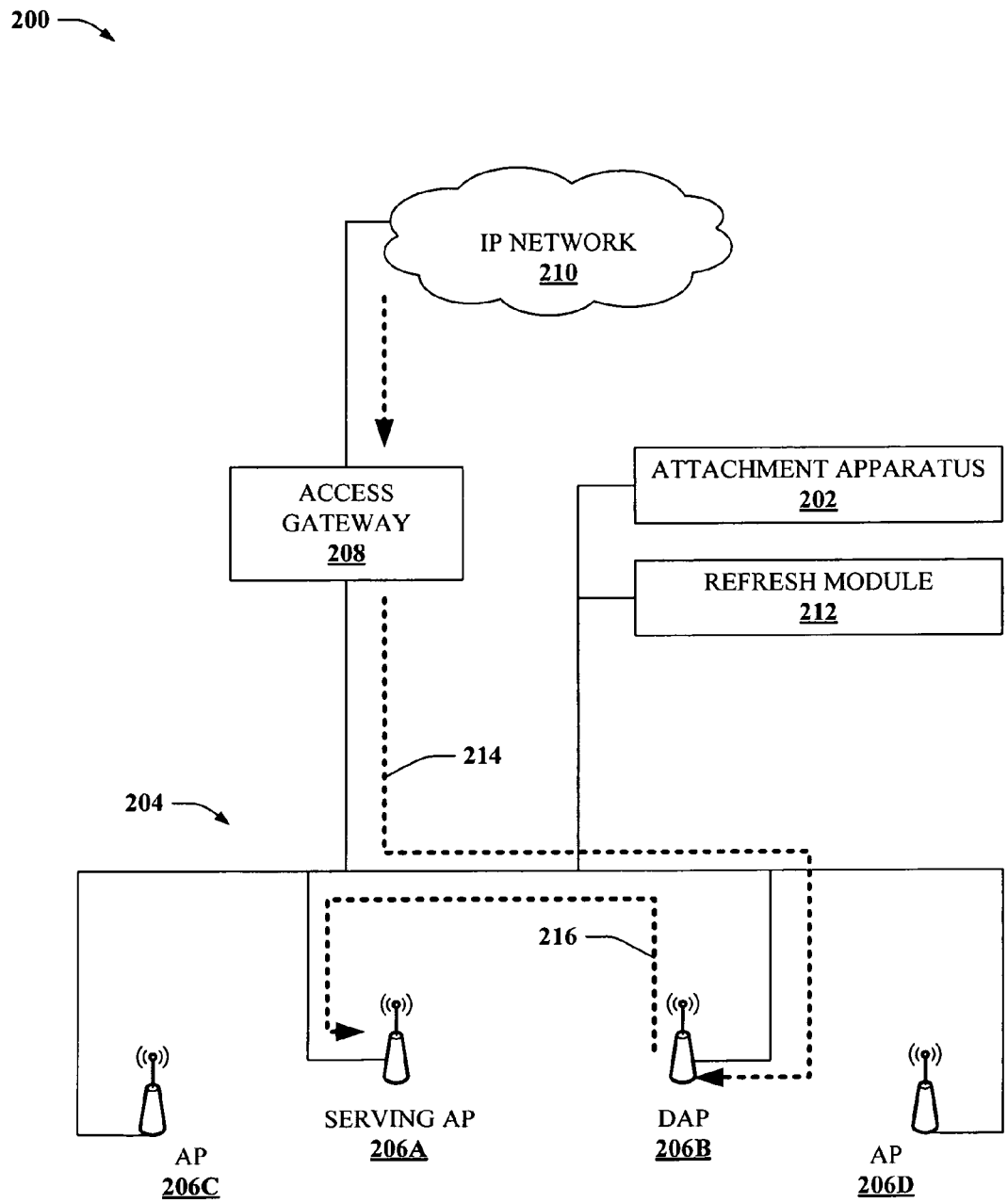
FIG. 2 depicts a block diagram of an example wireless AN that illustrates data flow through access points (APs) of the AN.
Figure 3:
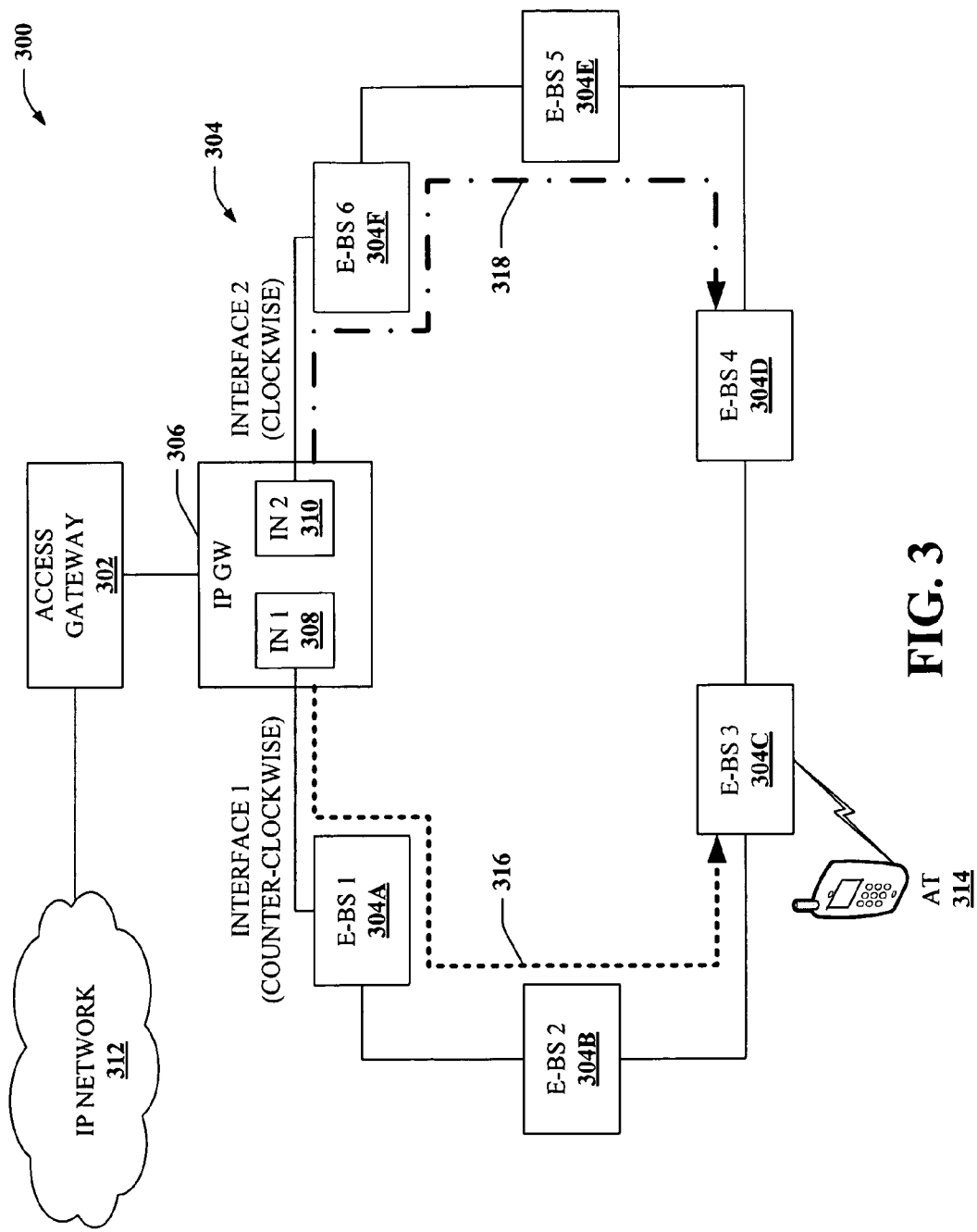
FIG. 3 illustrates a block diagram of an example DAP selection based on a DAP selection algorithm(s) provided in aspects the subject disclosure.
Figure 4:
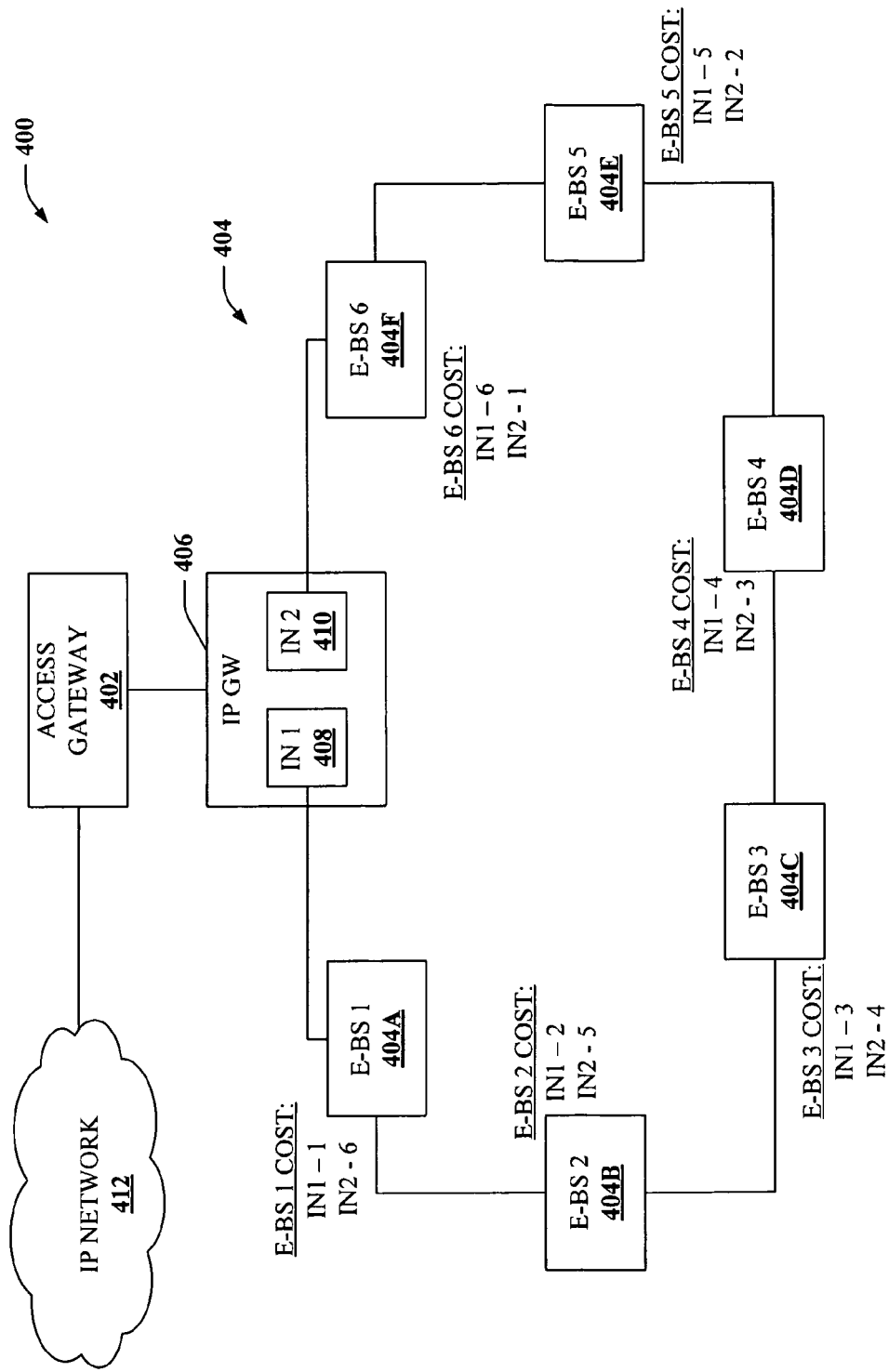
FIG. 4 illustrates a block diagram of another example DAP selection based on a DAP selection algorithm(s).

FIG. 2 illustrates a block diagram of a sample system 200 that can manage selection of a DAP (206B) in a wireless AN 204. Data from an IP network 210 such as the Internet, and addressed to an AT (not depicted), can be forwarded by an AGW 208 to a current DAP 206B serving the AT, as depicted by the dotted arrow at 214. In addition, the DAP 206B can forward the data to a serving AP 206A coupled with the AT, as depicted by the dotted arrow at 216. Accordingly, system 200 can facilitate data communication for mobile devices utilizing various APs (206A, 206B, 206C, 206D) of the wireless AN 204.

In addition to the foregoing, system 200 can facilitate selection and/or updating a location of the DAP 206B. Selection/updating of the DAP 206B can be implemented by an attachment apparatus 202 based on a cost metric of a current AP (206B) assigned as the DAP 206B compared with another AP (206A, 206C, 206D) (e.g., serving AP 206A). Selection/updating can be substantially as described elsewhere herein.

Furthermore, system 200 can comprise a refresh module 212 that updates the cost metric for wireless APs based on a change in network topology of the wireless AN. For instance, in a semi-planned/unplanned deployment of APs (206A, 206B, 206C, 206D), or failure in a planned deployment of APs, an AP can be removed from the wireless AN 204, or an additional AP can be added to the wireless AN 204. Addition/removal of an AP (206A, 206B, 206C, 206D) from the AN 204 can change previously determined cost metrics associated with each AP (206A, 206B, 206C, 206D). Refresh module 212 can update the cost metrics based on a current network topology and provide the updated data to attachment apparatus 202 (or, e.g., a central controller), the APs 206A, 206B, 206C, 206D and/or one or more ATs. In another example, the serving AP 206A might be removed from the wireless AN 204. Refresh module 212 can determine the removal and initiate an updated registration for ATs losing access to the wireless AN 204 based on removal of a serving AP (206A). As another example, one or more AGWs 208 can be added/removed from the wireless AN 204, changing the network topology and cost metrics of APs (206A, 206B, 206C, 206D) (e.g., see FIG. 6, infra). Thus, by determining changes to the structure of system 200, refresh module 212 can facilitate re-determination of DAP 206B, serving AP 206A, AP cost metrics and the like at the attachment module 202, enabling system 200 to dynamically adapt to maintain data flow (214, 216) in changing conditions typical of many types of mobile communication networks.

FIGS. 3-7 depict block diagrams of examples (300, 400, 500, 600, 700) of selecting a DAP or switching a DAP from a one AP of a wireless AN to another AP of the wireless AN. The various examples (300, 400, 500, 600, 700) provide illustrations of different scenarios where switching a DAP to a serving AP according to algorithms provided herein is desired, based on efficiency metrics. For instance, where a current DAP and a serving AP utilize substantially similar backhaul network resources, switching the DAP to the serving AP can be inefficient due to switching overhead costs. It should also be appreciated that other examples other than those depicted and described below (300, 400, 500, 600, 700) can be applicable to the DAP establishment/selection algorithms provided herein. Such other examples, known to one of skill in the art or made known to one of skill in the art by way of the context provided by the subject disclosure are incorporated herein.

System 300 depicts an example system 300 comprising a data AGW 302 (e.g., an interface to a data GW) that couples an IP GW 306 (or, e.g., other suitable data network GW) with an IP network 312, such as the Internet. The IP GW 306 is further coupled to APs (304A, 304B, 304C, 304D, 304E, 304F) of a wireless AN 304. In some aspects, wireless AN 304 comprises a backhaul network that couples each AP (304A, 304B, 304C, 304D, 304E, 304F) with other APs (304A, 304B, 304C, 304D, 304E, 304F) and with the IP GW 306, either directly or indirectly. The backhaul network can comprise any suitable wired or wireless connection. Wired connections can include Ethernet, coaxial cable, telephone line, digital subscriber line, broadband over power line, or the like. Wireless connections can include any suitable radio frequency (e.g., WiFi, cellular), microwave frequency (e.g., worldwide interoperability for microwave access [WiMAX]), optical frequency, or other electromagnetic frequency suitable for carrying data through a non-wired medium (e.g., air). It should also be appreciated that although the APs (304A, 304B, 304C, 304D, 304E, 304F) are depicted as eBSs (e.g., in a UMB network), any suitable AP and RAN technology, described herein or known in the art, can be utilized in system 300 and other suitable aspects of the disclosure.

As depicted, the IP GW 306 comprises two IP interfaces, IN 1 308 and IN 2 310. IN 1 308 provides a counter-clockwise path 316 for data flow to the APs (304A, 304B, 304C, 304D, 304E, 304F). In contrast, IN 2 provides a clockwise path 318 for data flow to the APs (304A, 304B, 304C, 304D, 304E, 304F). Thus, performance and network 304 resources utilized to deliver data to a particular AP (304A, 304B, 304C, 304D, 304E, 304F) can depend on which AP (304C) an AT 314 is attached to, and which AP (304B) currently serves as a DAP for the AT 314. Thus, for instance, the AT 314 could currently be served by AP 304C, and have AP 304B act as the DAP. An attachment apparatus (not depicted, but see FIG. 1 at 102, supra) can determine whether to leave the DAP at AP 304B or move it to another AP, such as serving AP 304C, based on cost metrics of the two APs 304B, 304C with respect to one or more AGWs 308, 310 of the wireless AN 304.

In one particular example, an algorithm for determining whether to move the DAP to a serving AP (e.g., 304C) is as follows. A minimum cost metric for the serving AP (304C) with respect to any data interface (308, 310) of a data network gateway (306) is determined. If the minimum cost metric is smaller than a cost metric of the current DAP to the same data interface (308, 310), then the serving AT (304C) can become the DAP. If the cost metric of the serving AP (304C) or DAP to a data interface (308, 310) is not discovered or advertised, then the cost can be assumed to be large relative to other cost metrics (e.g., infinite). Applications of such an algorithm and like algorithms are described below.

According to one aspect, such an attachment module (e.g., located centrally at IP GW 306, at one or more of the APs 304B, 304C, and/or AT 314) can determine the AGW 308, 310 that provides the lowest cost metric (e.g., hop count) to the serving AP 304C. Utilizing hop count as the cost metric, it can readily be determined that IN 1 308 provides the lowest hop count, 3, for the serving AP 304C. In addition, the attachment module can obtain a hop count for the DAP (304B) to the same AGW 308. Because the hop count associated with the serving AP 304C is not less than the hop count associated with the DAP (304B), the DAP can be maintained at the current DAP AP 304B to utilize fewer system resources (e.g., after at least a threshold period of time has passed after the AP 304B becoming the serving AP in some circumstances). For instance, moving the DAP (304B) to serving AP 304C does not reduce the data path and overall backhaul cost metric to deliver data to AT 314. However, overhead cost associated with moving the DAP can utilize such resources, so the most efficient use of network 304 resources in this case results in leaving the DAP at AP 304B.

System 400 provides a particular determination of cost metric for APs (404A, 404B, 404C, 404D, 404E, 404F) of a wireless AN 404. An IP GW 406, comprising two interfaces 408, 410 (e.g., local AGWs), is coupled to an IP network 412 via an access GW 402. Furthermore, each AP (404A, 404B, 404C, 404D, 404E, 404F) is assigned a cost metric relative to each of the two interfaces 408, 410. For instance, a first AP 404A directly coupled with IN 1 408 has a cost metric, in this case hop count, of 1 to IN 1 408 and a cost metric of 6 to IN 2 410. Likewise, a second AP 404B has a cost metric of 2 to IN 1 408 and a cost metric of 5 to IN 2 410, and so on. Hop count metrics can be determined at each AP (404A, 404B, 404C, 404D, 404E, 404F) for the respective AP, at an AT coupled to one or more of the APs (404A, 404B, 404C, 404D, 404E, 404F) or at a centralized controller (not depicted) coupled with the APs (e.g., 406). Furthermore, cost metrics of each AP (404A, 404B, 404C, 404D, 404E, 404F) can be shared among the other APs, collected at the AT or collected at the centralized controller. Thus, DAP selection can be determined at a particular AP, at an AT, or at the centralized controller, as suitable.

Figure 5:
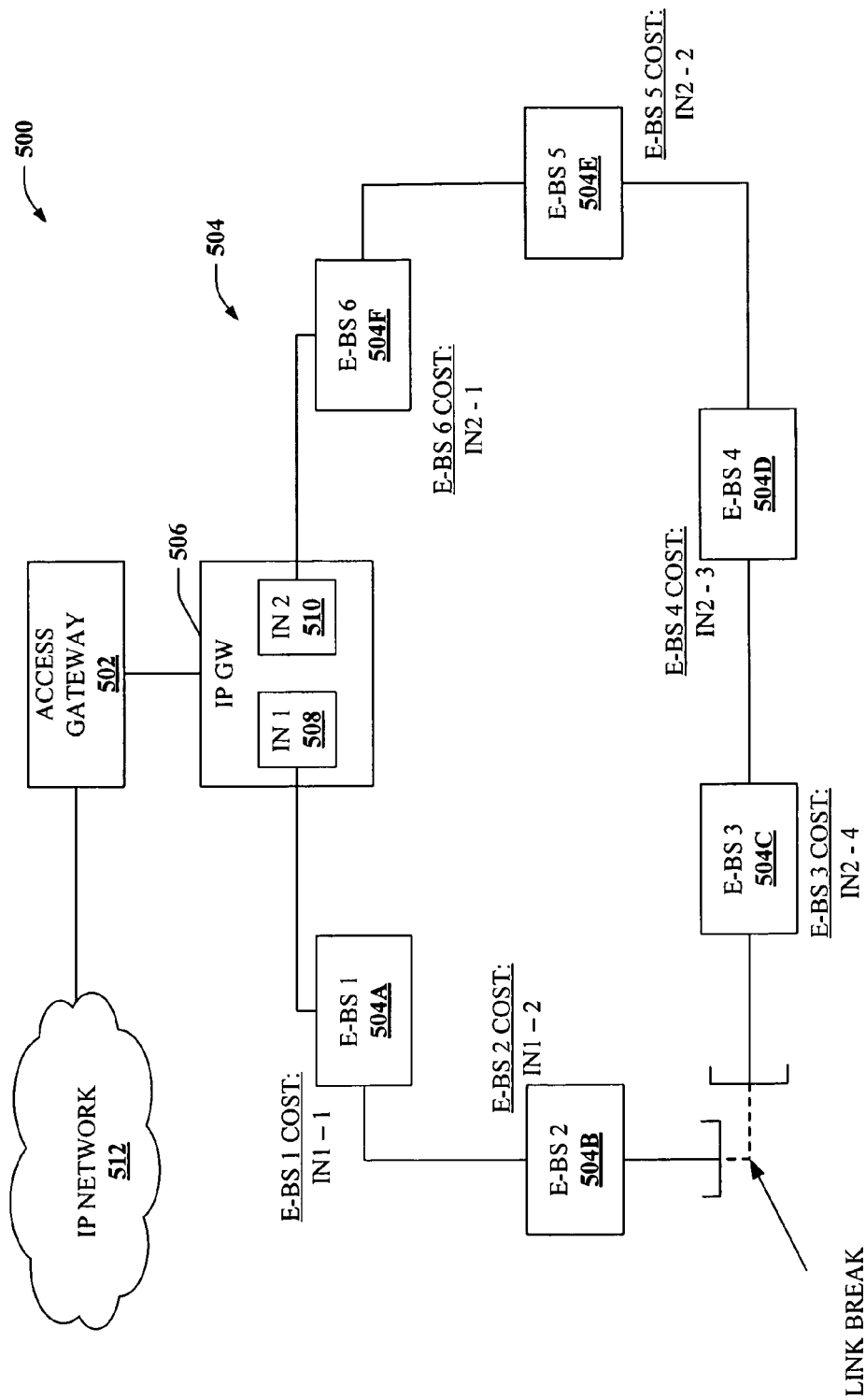
FIG. 5 depicts a block diagram of yet another example DAP selection based on a DAP selection algorithm(s).

System 500 illustrates an additional example of a wireless AN 504 and cost metrics of various APs (504A, 504B, 504C, 504D, 504E, 504F) of the wireless AN 504. Wireless AN 504 comprises a line break between AP 504B and AP 504C, as depicted at FIG. 5. Thus, as depicted, each AP is coupled with IP GW 506 (and thus also to AGW 502 and IP network 512) by way of only a single interface 508, 510. Thus, APs 504A and 504B have cost metrics of 1 and 2, respectively, with respect to IN 1 508. Likewise, APs 504C, 504D, 504E and 504F have cost metrics of 4, 3, 2 and 1, respectively, with respect to IN 2 510. As a particular example, contrast system 500 with system 300. System 300 includes an AT 314 coupled with a serving AP 304C and having a DAP at AP 304B. If a similar situation existed for system 500, the AT would be attached to AP 504C and the DAP would be configured at AP 504B. However, whereas in system 300 the most efficient use of network 304 resources involves keeping the DAP (304B) at AP 304B, in system 500 the opposite exists due to the link break. Thus, the interface 508, 510 providing the lowest cost metric for the serving AP 504C is IN 2 510 (since the cost metric to IN 1 508 is infinite, or at least 5 if IN 1 508 is configured to communicate with IN 2510, for AP 504C). The serving AP 504C has a hop count metric of 4 to IN 2 510, but AP 504B has an infinite hop count metric to IN 2 510. Accordingly, the DAP (504B) is switched to the serving AP 504C in system 500 to provide lowest system resources.

As described with respect to system 500, it can be important to determine changes in network topology (504) such as the line break between APs 504B and 504C. Accordingly, a refresh module (e.g., see refresh module 212 at FIG. 2, supra) can be useful to monitor network topology. Monitoring can include maintaining hop counts or other cost metrics of APs (504A, 504B, 504C, 504D, 504E, 504F) of the wireless AN 504, determining inter-AP connectivity of the AN 504, identifying APs (504A, 504B, 504C, 504D, 504E, 504F) and/or interfaces 508, 510 added or removed from the AN 504, or the like. By maintaining current network topology information, such as system 500 can dynamically respond to changing network 504 conditions to maintain lowest cost metrics of selected DAPs, according to the mechanisms provided herein.

System 600 provides an example of a wireless AN 604 comprising a central controller 618 and multiple IP GW 606A, 606B access points to the AN 604. The central controller 618 can, according to some aspects, comprise an apparatus (e.g., attachment apparatus 102) that can establish and/or switch a DAP to APs (604A, 604B, 604C, 604D, 604E, 604F) of the wireless AN 604. According to other aspects, the central controller can collect data from the APs (604A, 604B, 604C, 604D, 604E, 604F) related to cost metrics as described herein. The data can further be relayed to such APs (604A, 604B, 604C, 604D, 604E, 604F) for distributed DAP selection, according to alternative or additional aspects of system 600.

System 600 comprises two IP GWs 606A, 606B that can obtain data from an IP network 616 via an AGW 602. Each IP GW 606A, 606B comprises two GW interfaces, IN 1 608, IN 2 610, and IN 3 612, IN 4 614, respectively. In some aspects, the addition of an IP GW (606B) can be deemed a change in network topology, for example as compared with system 300. A component of AN 604 (e.g., refresh module 212) can detect such a change in network topology and update cost metric(s) of the APs (604A, 604B, 604C, 604D, 604E, 604F), provide cost metric data to the central controller 618 or the APs (604A, 604B, 604C, 604D, 604E, 604F), or to an AT (not depicted), as suitable. Accordingly, such information can be utilized in a distributed fashion at the APs (604A, 604B, 604C, 604D, 604E, 604F) or in a central location (618), as suitable.

As depicted, the APs (604A, 604B, 604C, 604D, 604E, 604F) can have relatively small cost metrics due to the addition of an IP GW 606B as compared with the above systems (300, 400, 500). Thus, cost metrics (e.g., hop counts) for the APs (604A, 604B, 604C, 604D, 604E, 604F) to at least two GW interfaces (608, 610, 612, 614) can be determined and associated with the APs (604A, 604B, 604C, 604D, 604E, 604F). For instance, AP 604A can have a cost metric of 1 to IN 1 608, and a cost metric of 3 to IN 3 612. Likewise, AP 604B can have a cost metric of 2 to IN 1 608 and IN 3 612, and so on. AP 604F can have a cost metric of 1 to IN 2 610 and a cost metric of 3 to IN 4 614, and so forth.

As an example of selection, assume the following scenarios. First, an AT has a serving AP at AP3 604C and a current DAP at AP2 604B. According to at least one algorithm disclosed herein (e.g., comparing the lowest hop count for serving AP 604C to an interface 612 with the hop count of the DAP 604B to the same interface 612), the DAP should be switched to the serving AP 604C to utilize the fewest resources in distributing data to the AT. Second, an AT has a serving AP at AP4 604D and a current DAP at AP3 604C. In such case, the DAP should be switched to serving AP 604D to utilize the lowest resources. Third, an AT has a serving AP at AP2 604B and a current DAP at AP6 604F. IN such case, the DAP should be switched to serving AP 604B to utilize the lowest resources.

System 700 depicts an example wireless AN comprising an AGW 702 that couples an IP network 704 to APs 706A, 708B of the AN. In addition, a third AP 708 is coupled to API 706A via a wireless backhaul network. When determining cost metrics of the APs 706A, 706B, 708, relative connection quality can be determined. For instance, bandwidth, data rate, and so on can be measured at the various APs 706A, 706B, 708 relative the AGW 702. Typically, the APs 706A, 706B directly coupled with the AGW 702 will have high quality connections. Thus, as depicted, such APs 706A, 706B can be assigned a unit cost metric, based on hop count for instance. Where the wireless backhaul provides significantly lower connection quality than the direct connections to the AGW 702, a high cost metric (e.g., infinite) can be assigned to AP3 708. Accordingly, in such aspects the DAP will be assigned to AP1 706A where AP3 708 is the serving AP for AT 710. Where AT 710 is served by APs 1 or 2, 706A, 706B, the DAP will typically remain at a current DAP, since neither AP1 706A nor AP2 706B has a lower hop count than the other to AGW 702. Where another metric is utilized, such as bandwidth, data rate, traffic load, or the like, a determination can be made as to whether the DAP should switch to the serving AP 706A, 706B if the AT 710 attaches from one AP 706A, 706B to the other 706B, 706A.

Figure 8:
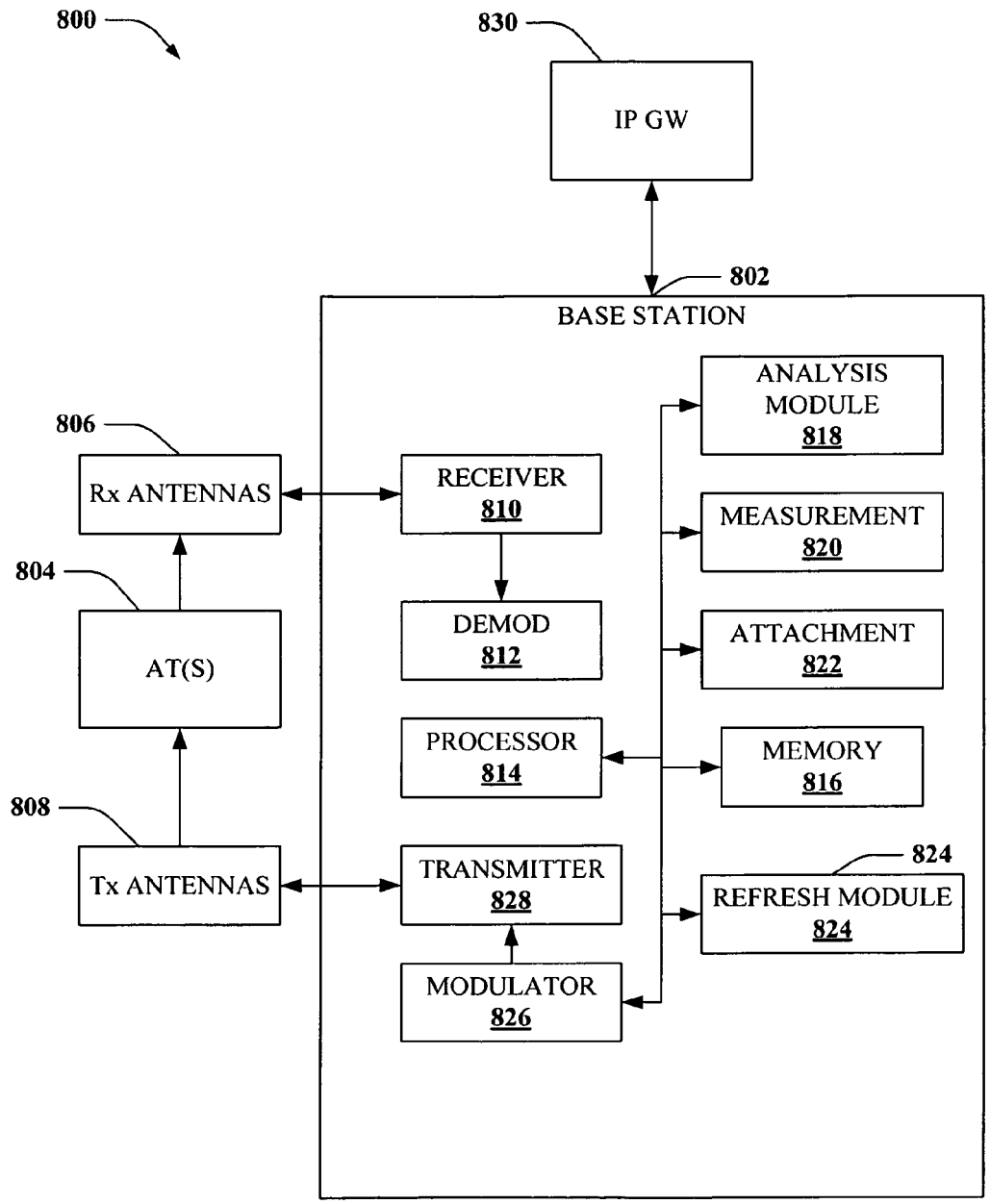
FIG. 8 illustrates a block diagram of a sample base station that facilitates DAP selection for an access terminal (AT) according to aspects of the disclosure.

FIG. 8 illustrates a block diagram of a system 800 comprising a sample base station 800 that facilitates DAP selection for ATs 804 according to aspects of the disclosure. Base station 802 can be coupled directly or indirectly with an IP GW 830 and facilitate data exchange between the IP GW 830 and the AT(s) 804. In at least one aspect of the subject disclosure, base station 802 can determine a cost metric of the connection between the IP GW 830 and the base station 802. The cost metric can be based on a hop count, weighted topological distance (e.g., where other base stations, not depicted, provide an indirect link between the IP AG 830 and base station 802), data rate, bandwidth, traffic load, or the like. The cost metric can be utilized to determine whether a DAP for the AT(s) 804, set at another base station (not depicted), should be moved to base station 802. Transferring a DAP for the AT(s) 804 can be based at least in part on the cost metric of the base station 802 compared with a cost metric of the other base station. Accordingly, system 800 facilitates minimizing resource costs associated with maintaining a DAP when the AT(s) 804 attaches to the base station 802 or other base stations in conjunction with wireless communication.

Base station 802 (e.g., access point, . . . ) can comprise a receiver 810 that receives signal(s) from one or more mobile devices 804 through a plurality of receive antennas 806, and a transmitter 828 that transmits signals to the one or more ATs 804 through a transmit antenna(s) 808. Receiver 810 can receive information from receive antennas 806 and can further comprise a signal recipient (not shown) that receives uplink data transmitted by AT(s) 804. Additionally, receiver 810 is operatively associated with a demodulator 812 that demodulates received information. Demodulated symbols are analyzed by a processor 814, which also provides symbols to a modulator 826 for transmission. Processor 814 is coupled to a memory 816 that stores information related to functions provided by base station 802. In one instance, stored information can comprise cost metrics of the base station and one or more other base stations of a wireless AN (not depicted). Particularly, the stored information can comprise algorithms for determining whether to maintain a DAP for the AT(s) 804 at base station 802 or to move the DAP from another base station to base station 802.

Processor 814 is further coupled to an analysis module 818 that can establish a cost metric for the base station 802 and/or other base stations coupled to IP GW 830. Cost metric information can be stored in memory 816 for access by other components (820, 822, 824) of base station 802. A measurement module 820 can compare a cost metric of base station 802 to a cost metric of another base station acting as a DAP for AT(s) 804. Furthermore, an attachment module 822 can establish base station 802 as the DAP based at least in part on the comparison. For instance, if the cost metric of base station 802 is lower than (or, e.g., otherwise consumes less communication resources) the cost metric of the current DAP, attachment module 822 will set base station 802 as the DAP for AT(s) 804. In one particular example, analysis module 818 can obtain cost metrics of base station 802 and the DAP with respect to a plurality of IP GWs (830) (e.g., by way of an inter-AP link such as a backhaul network, or from the AT(s) 804). Further, analysis module 818 can identify a lowest cost metric of base station 802 relative to the plurality of IP GWs (830). The measurement module 820 can compare this lowest cost metric to a cost metric of the current DAP with respect to the IP GW (830) associated with the lowest cost metric for base station 802. If the lowest cost metric is less than the DAP cost metric with respect to such IP GW (830), attachment module will set base station 802 as the DAP for AT(s) 804. Otherwise, the attachment module 822 can maintain the DAP at its current location.

In addition to the foregoing, base station 802 can comprise a refresh module 824 that can update the cost metric for base station 802 and other base stations coupled to IP GW 830 based on a change in a wireless AN topology. Thus, if a new base station is coupled with IP GW 830 (e.g., in a semi-planned or unplanned network deployment), a link between the IP GW 830 and base station 802 or another such base station is broken, or the like. Updated cost metrics can be stored in memory 816 and utilized by analysis module 818, measurement module 820 and/or attachment module 822 to re-evaluate a DAP for AT(s) 804, in substantially similar fashion as described above. Thus, base station 802 can provide dynamic DAP determinations to adapt to an evolving network.

Figure 9:
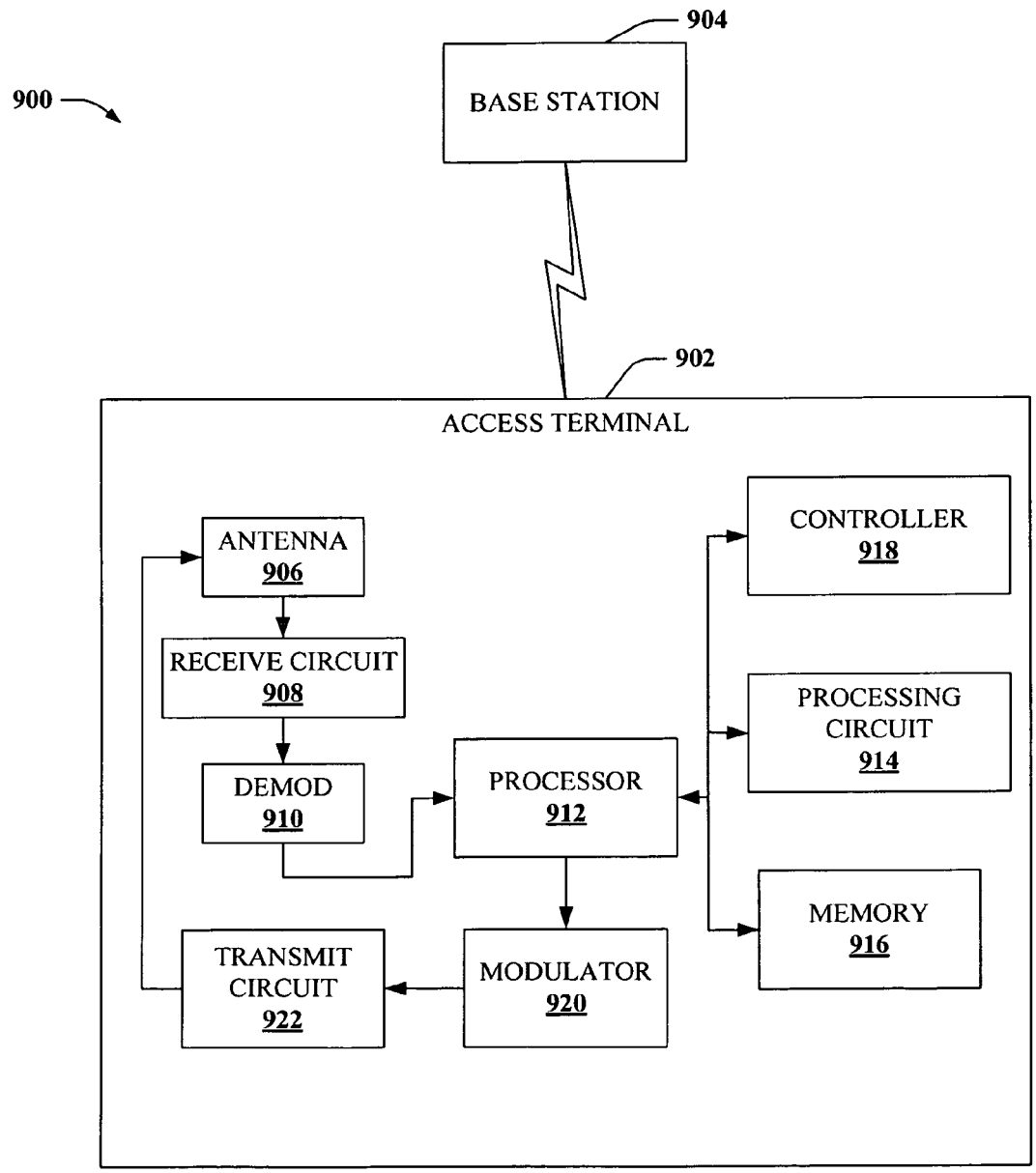
FIG. 9 depicts a block diagram of an example AT that facilitates DAP selection according to further aspects of the disclosure.

FIG. 9 illustrates a block diagram of an example system 900 that comprises an AT 902. AT 902 can be configured to wirelessly couple with one or more base stations (904) and indirectly to affiliated mobile networks, data networks (e.g., the Internet), or the like (not depicted) via the base stations (904). AT 902 can additionally be configured to obtain cost metrics of such base stations (904) and transmit the metrics to a serving base station 904. In some aspects, AT 902 can further perform cost metric determinations to identify which of the base stations (904) provides a most efficient utilization of data resources of a network of such base stations (904).

AT 902 includes at least one antenna 906 (e.g., a transmission receiver or group of such receivers comprising an input interface) that receives a signal (e.g., a wireless signal, such as an OTA message) and receive circuit(s) 908, which performs typical actions (e.g., filters, amplifies, down-converts, etc.) on the received signal. In general, antenna 906, receive circuit(s) 908 and transmit circuit 922 (collectively referred to as a transceiver) can be configured to facilitate wireless data exchange with base station(s) 904. According to at least some aspects, a processing circuit 914 can analyze signals obtained from demodulator(s) 910 and/or processor 912 and extract cost metric information of such signals. The extracted cost metric information can be stored in memory 916, as a function of a base station and/or IP GW (not depicted) from which a cost metric is received.

Demodulator(s) 910 can demodulate symbols received from antenna(s) 906 and provide the demodulated symbols to the processor(s) 912 for evaluation. In some aspects, receive circuit(s) 908 can obtain cost metric information from base stations (904) as described herein. In a particular example, the receive circuit(s) 908 can obtain cost metric information of multiple base stations (904) relative to one or more IP GWs, based on signals received from such base stations (904) at antenna(s) 906. The cost metrics can be analyzed by a processing circuit 914 to facilitate establishment of or switching a DAP of AT 902 based at least in part on the cost metrics. For instance, processing circuit 914 can compare the cost metrics of the various base stations (904) with respect to a serving base station 904 attached to the AT 902. If the cost metric of the serving base station 904 is lower than that of a current or default DAP, with respect to a particular IP GW (e.g., an IP GW that provides a lowest cost metric for the serving base station 904), the processing circuit 914 can provide a result of the comparison to transmit circuit 922. The transmit circuit 922 can be configured to forward the result to the serving base station 904 if the cost metric of the serving base station 904 is lower than the cost metric of the current or default DAP. By forwarding the result, AT 902 can facilitate transferring the DAP to the serving base station 904, as described herein.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include analysis module 108, measurement module 110, attachment module 112, and refresh module 212, or a different combination of these and other components. Sub-components could also be implemented as components communicatively coupled to other components rather than included within parent components. Additionally, it should be noted that one or more components could be combined into a single component providing aggregate functionality. For instance, attachment apparatus 202 can include refresh module 212, or vice versa, to facilitate determining efficient DAPs in a wireless AN and updating cost metric information based on network topology changes by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 10:
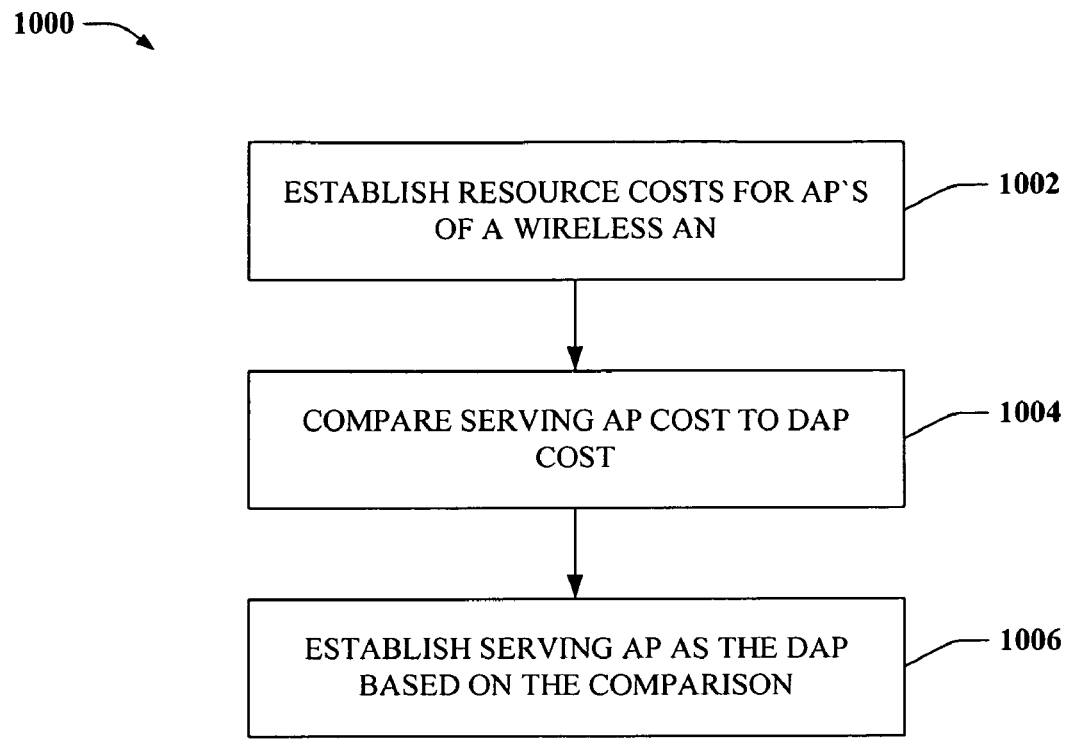
FIG. 10 illustrates a flowchart of a sample methodology for selecting a DAP in a wireless AN according to some aspects.
Figure 11:
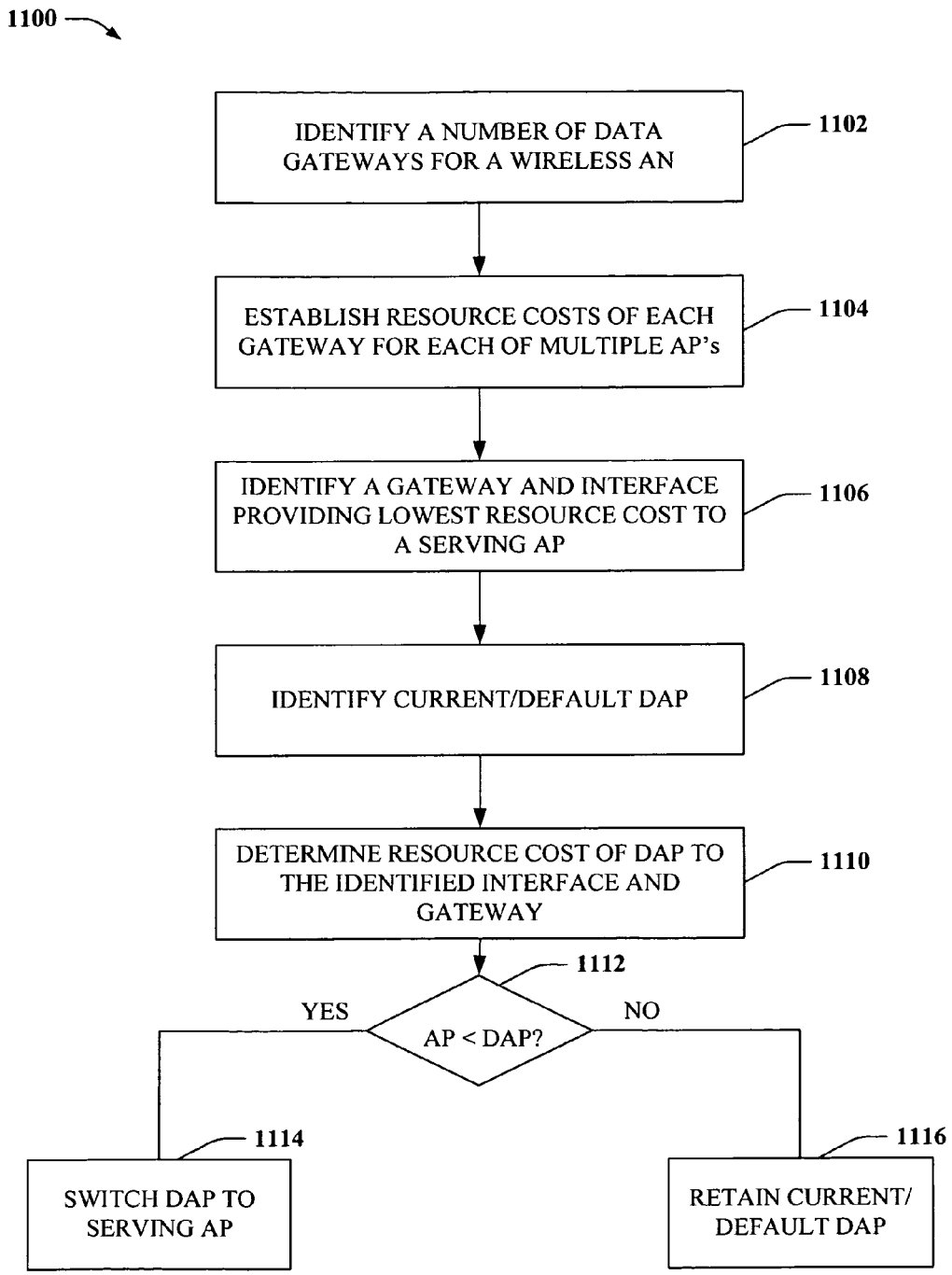
FIG. 11 depicts a flowchart of an example methodology for switching a DAP to a serving AP of an AT according to additional aspects.
Figure 12:
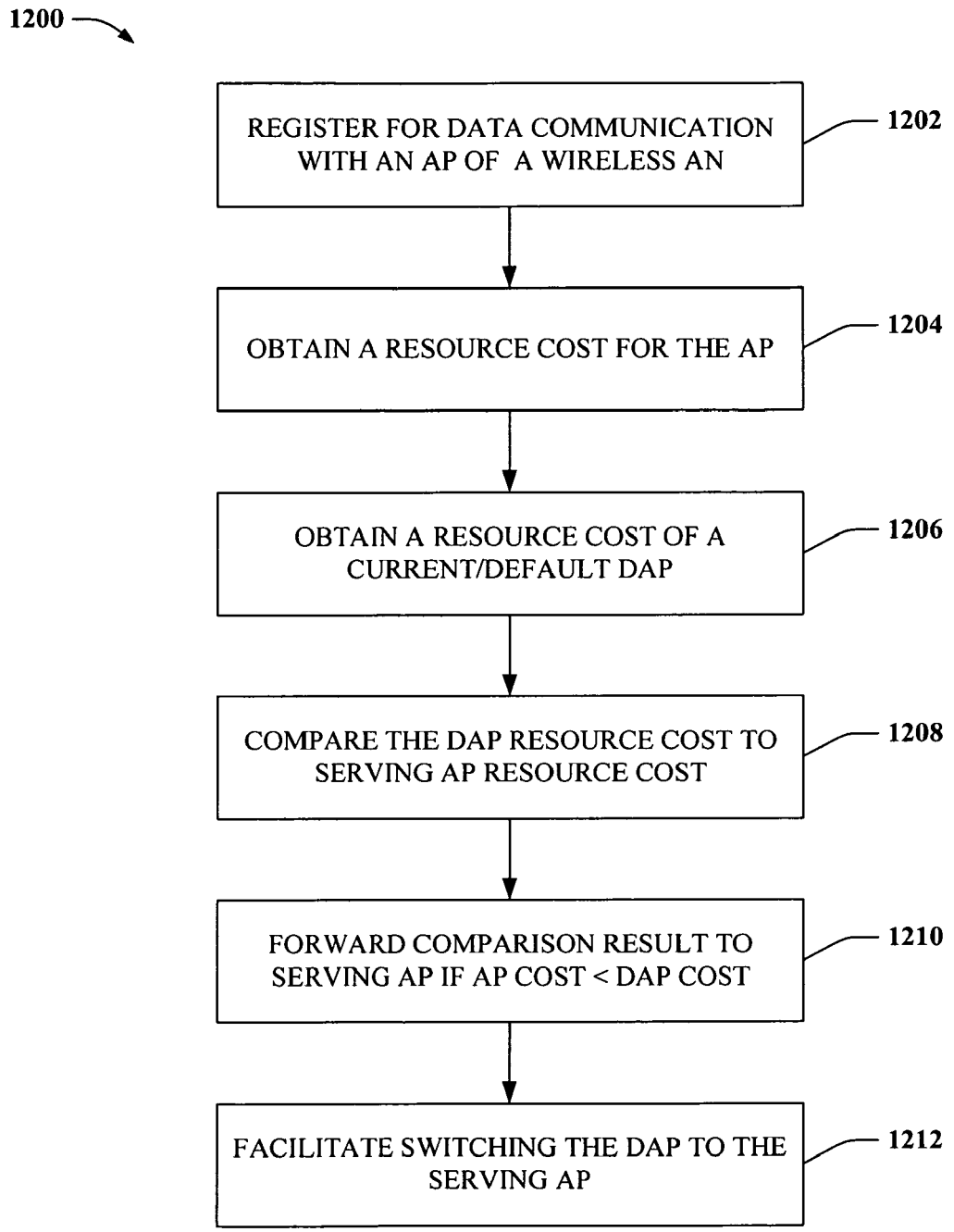
FIG. 12 illustrates a flowchart of an example methodology for facilitating establishment of a DAP in a wireless AN according to still other aspects.

In view of the exemplary systems described sura, methodologies that may be implemented in accordance with the disclosed subject matter will be better appreciated with reference to the flow charts of FIGS. 10-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 10 illustrates a flowchart of an example methodology 1000 for providing efficient determination of a DAP in a wireless AN, according to aspects of the subject disclosure. At 1002, method 1000 can establish resource costs for APs of the wireless AN. The resource costs can be based on various quality of service or data exchange metrics associated with the wireless AN. In at least one aspect, a dynamic metric of the wireless AN can comprise the resource cost. Examples of resource costs and/or dynamic wireless AN metrics can comprise a hop count or weighted topological distance to an IP GW, an available link bandwidth, a current data rate, latency or traffic load of a wireless AP, or the like or a combination thereof. It should also be appreciated that the APs can be coupled with an inter-AP link (e.g., a backhaul network) that facilitates data exchange between the APs.

At 1004, method 1000 can compare a resource cost of a serving AP to a resource cost of a current or default DAP. The serving AP and DAP are typically determined with respect to a common AT attached to the serving AP. However, because the AT can be a mobile device, the serving AP can change as the AT moves from one geographic location to another. Accordingly, the resource costs can further be updated as suitable with changes to the serving AP and/or DAP. In addition, the resource cost of the serving AP and the current or default DAP can be relative to a common IP GW with which the serving AP and DAP can exchange data, either directly or indirectly.

At 1006, method 1000 can establish the serving AP as the DAP based at least in part on the comparison performed at reference number 1004. For instance, where the resource cost relative a particular IP GW is lower for the serving AP than the DAP, the serving AP can be established as the DAP. Accordingly, method 1000 provides a mechanism to update a DAP for an AT based on current AP resource costs and/or changes in the resource costs (e.g., based on a change in network topology).

FIG. 11 depicts a flowchart of an example methodology 1100 for switching a DAP to a serving AP of an AT according to additional aspects of the subject disclosure. At 1102, method 1100 can identify a number of data network GWs (e.g., Internet GWs) associated with a wireless AN. At 1104, method 1100 can establish resource costs of each IP GW for each of multiple APs associated with the wireless AN, as described herein. At 1106, method 1100 can identify a serving AP associated with the AT, and can also identify a data network GW and interface to such GW that provides the lowest resource cost for the serving AP (e.g., with respect to other such GWs and/or interfaces). Further, at 1108, method 1100 can identify a current and/or default DAP associated with the AT. At 1110, method 1100 can determine a resource cost of the DAP with respect to the identified interface and data network GW. At 1112, method 1100 can determine whether the resource cost for the serving AP, with respect to the identified interface and data network GW, is lower than the resource cost for the DAP, with respect to the same interface and GW. If the resource cost of the serving AP is lower than the resource cost of the DAP, method 1100 can proceed to 1114; otherwise, method 1100 can proceed to 1116. At 1114, method 1100 can switch the DAP to the serving AP. In contrast, at 1116, method 1100 retains the current/default DAP as the DAP for the AT.

FIG. 12 illustrates a flowchart of a sample methodology 1200 that facilitates determining a DAP for an AT coupled to a wireless AN. At 1202, method 1200 can register for data communication with an AP of the wireless AN. The registered AP can be a serving AP for the AT, so long as the AT is registered with that AP. At 1204, method 1200 can obtain a resource cost for the serving AP with respect to at least one IP GW, as described herein. At 1206, method 1200 can further obtain a resource cost of a current or default DAP assigned to the AT. At 1208, method 1200 can compare the resource cost of the serving AP with the resource cost of the current/default DAP. At 1210, a result of the comparison is forwarded to the serving AP if the resource cost of the AP is less than the resource cost of the DAP. Finally, at 1212, method 1200 can facilitate switching the DAP from the current/default DAP to the serving AP, based at least in part on the result of the comparison.

Figure 13:
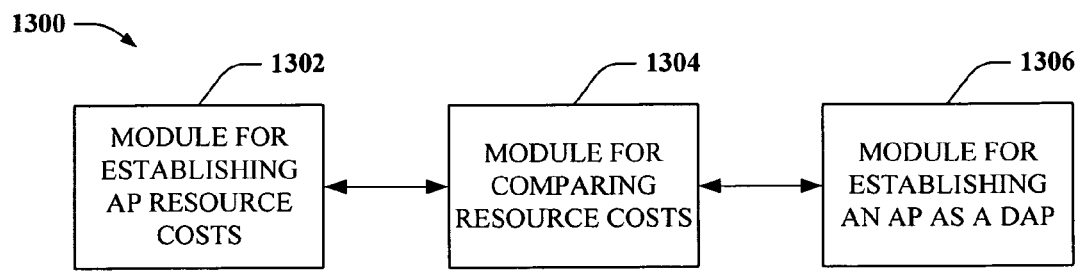
FIG. 13 depicts a block diagram of an example system that provides selection of a DAP in a wireless AN.

FIG. 13 depicts a block diagram of an example system 1300 that provides selection of a DAP for an AT coupled with a wireless AN. System 1300 can be located at an AP of the wireless AN, at a central controller of the wireless AN, at the AT, or distributed across a combination of the foregoing entities. A module 1302 for establishing AP resource costs can determine a resource cost for at least two wireless APs of the wireless AN. Further, a module 1304 for comparing resource costs can compare the resource cost associated with a serving AP coupled with the AT and a current or default DAP assigned to the AT. Additionally, system 1300 can comprise a module 1306 for establishing an AP as a DAP, that establishes the serving AP as the DAP based at least in part on the comparison. In one specific aspect, module 1306 can establish the serving AP as the DAP if module 1304 determines that the resource cost associated with the serving AP is lower than the resource cost associated with the DAP. Thus, in such aspects, system 1300 can facilitate improved efficiency in the wireless AN by updating a DAP for the AT to the serving AP, where such AP provides utilizes fewer communication and/or quality resources of the wireless AN, with respect to the current/default DAP.

Figure 14:
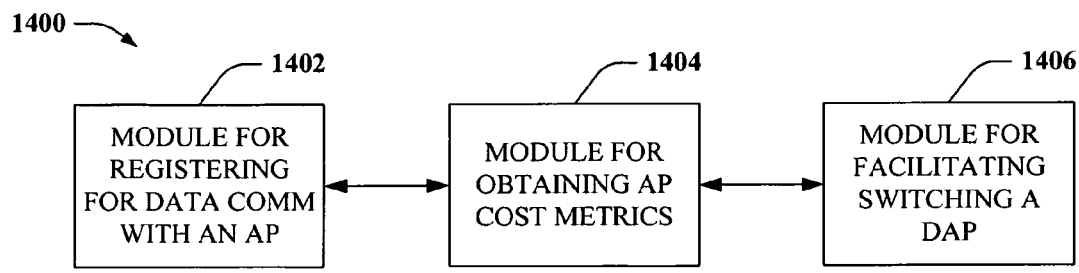
FIG. 14 illustrates a block diagram of an example system that facilitates selection of a DAP in a wireless AN.

FIG. 14 illustrates a block diagram of an example system 1400 that can facilitate switching a DAP among APs of a wireless AN. In a similar manner as described with respect to system 1300, supra, system 1400 can be located at one or more of the APs, at a central controller of the wireless AN, at the AT, or a combination thereof. System 1400 can comprise a module 1402 for registering data communication with an AP. The module 1402 can, for instance, register for data communication with an AP of the wireless AN that is communicatively coupled with the AT. System 1400 can further comprise a module 1404 for obtaining AP cost metrics associated with the wireless AN, where such cost metrics are relative to an IP GW coupled with the wireless AN. Specifically, module 1404 can obtain a cost metric associated with the registered AP relative to the IP GW. In addition, a module 1406 for facilitating switching a DAP assigned to the AT can facilitate establishment of, or switching, the DAP from a current/default DAP to the registered AP. As described herein, establishment/switching the DAP can be based on a comparison of the cost metric of the registered AP with respect to the IP GW and a cost metric of the current/default DAP with respect to the IP GW. Where the AP cost metric is lower than the DAP cost metric, module 1406 can update the wireless AN to facilitate switching/establishing the registered AP as the DAP for the AT.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

The invention claimed is:

1. A method of selecting a data attachment point (DAP) for a wireless access network (AN), comprising:
    establishing a resource cost for at least two wireless access points (AP) of the wireless AN with respect to an Access Gateway (AGW);
    comparing a resource cost of a serving AP, the serving AP coupled to an access terminal (AT) to provide wireless communication between the AT and one or more networks, to a resource cost of a current or default DAP, the current or default DAP being an AP to which the AGW routes downlink data packets for the AT and that tunnels the downlink data packets to the serving AP;
    maintaining the current or default DAP when the serving AP resource cost is higher than the DAP resource cost; and
    establishing the serving AP as the DAP when the serving AP resource cost is lower than the DAP resource cost and when a difference between the serving AP resource cost and the DAP resource cost is greater than a switching overhead cost.

2. The method of claim 1, further comprising employing a dynamic metric of the wireless AN for the resource cost.

3. The method of claim 1, establishing the resource cost further comprises determining a hop count or a weighted topological distance to a data interface of a data network gateway.

4. The method of claim 1, establishing the resource cost further comprises determining an available link bandwidth or latency and traffic load of the wireless APs.

5. The method of claim 1, comparing the resource cost further comprises dynamically discovering resource costs of APs of the wireless AN.

6. The method of claim 1, comparing the resource cost further comprises sharing the resource cost of the serving AP with the DAP or sharing the resource cost of the DAP with the serving AP.

7. The method of claim 1, further comprising:
    detecting a change in the network topology of the wireless AN that changes one or more potential routes between the AT and the AGW;
    re-calculating the resource cost for the serving AP and the current or default DAP to define respective updated resource costs;
    comparing the updated resource costs of the serving AP and the current or default DAP; and
    performing the maintaining of the current or default DAP, or the establishing of the serving AP, based on the respective updated resource costs.

8. The method of claim 1, establishing the resource cost further comprises determining a cost metric for the serving AP with respect to at least one data interface of each of multiple traffic gateways, each of the multiple traffic gateways providing a different path to the AGW.

9. The method of claim 8, further comprising determining which data interface provides the lowest cost metric for the serving AP.

10. The method of claim 9, further comprising:
obtaining the cost metric of the DAP with respect to the data interface determined to provide the lowest cost metric for the serving AP;
comparing the cost metric of the DAP to the lowest cost metric of the serving AP; and
switching the DAP to the serving AP if the lowest cost metric is lower than the cost metric of the DAP.

11. An apparatus that determines a data attachment point (DAP) for a wireless access network (AN), comprising:
an analysis module that establishes a cost metric for wireless access points (AP) of the wireless AN with respect to at least one AGW;
a measurement module that compares a cost metric of a serving AP, the serving AP coupled to an access terminal (AT) to facilitate wireless communication between the AT and one or more networks, to a cost metric of a current or default DAP, the current or default DAP being an AP to which the at least one AGW routes downlink data packets for the AT and that tunnels the downlink data packets to the serving AP; and
an attachment module that maintains the current or default DAP when the serving AP cost metric is higher than the DAP cost metric, and establishes the serving AP as the DAP when the serving AP cost metric is lower than the DAP cost metric and when a difference between the serving AP resource cost and the DAP resource cost is greater than a switching overhead cost.

12. The apparatus of claim 11, wherein the analysis module employs a dynamic metric of the wireless AN for the cost metric.

13. The apparatus of claim 11, wherein the analysis module employs a hop count or a weighted topological distance to the at least one data network gateway for the cost metric.

14. The apparatus of claim 11, wherein the analysis module employs an available link bandwidth or an AP's latency and traffic load for the cost metric.

15. The apparatus of claim 11, further comprising an inter-AP link that facilitates dynamic discovery of cost metrics of APs of the wireless AN.

16. The apparatus of claim 15, wherein the inter-AP link facilitates sharing the cost metric of the serving AP with the DAP or sharing the cost metric of the DAP with the serving AP.

17. The apparatus of claim 11, further comprising a refresh module that detects a change in the network topology of the wireless AN that changes one or more potential routes between the AT and the AGW, re-calculates the cost metric for the serving AP and the current or default DAP to define respective updated cost metrics, compares the updated cost metrics of the serving AP and the current or default AP, and performs the maintaining of the current or default AP or the establishing of the serving AP based on the respective updated cost metrics.

18. The apparatus of claim 11, wherein the analysis module determines a hop count for the serving AP with respect to at least one data interface of each of multiple traffic gateways, each of the multiple traffic gateways providing a different path to the AGW.

19. The apparatus of claim 18, wherein the analysis module determines which data interface provides the smallest hop count to the serving AP.

20. The apparatus of claim 19, wherein:
the analysis module obtains the hop count of the DAP to the data interface that is determined to provide the smallest hop count to the serving AP;
the measurement module compares the hop count of the DAP to the hop count of the serving AP; and
the attachment module switches the DAP to the serving AP if the serving AP has the lower hop count.

21. An apparatus that determines a data attachment point (DAP) for a wireless access network (AN), comprising:
means for establishing a resource cost for at least two wireless access points (AP) of the wireless AN with respect to each of multiple AGWs;
means for comparing a resource cost of a serving AP, the serving AP coupled to an access terminal (AT) to facilitate wireless communication between the AT and one or more networks, to a resource cost of a current or default DAP, the current or default DAP being an AP to which an AGW routes downlink data packets for the AT and that tunnels the downlink packets of the serving AP;
means for maintaining the current or default DAP when the serving AP resource cost is higher than the DAP resource cost; and
means for establishing the serving AP as the DAP when the serving AP resource cost is lower than the DAP resource cost and when a difference between the serving AP resource cost and the DAP resource cost is greater than a switching overhead cost.

22. A processor configured to determine a data attachment point (DAP) for a wireless access network (AN), comprising:
a first module that establishes a resource cost for at least two wireless access points (AP) of the wireless AN with respect to multiple AGWs;
a second module that compares a resource cost of a serving AP, the serving AP coupled to an access terminal (AT) to facilitate wireless communication between each AT and one or more networks, to a resource cost of a current or default DAP, the current or default DAP being an AP to which an AGW routes downlink data packets for the AT and that tunnels the downlink packets the serving AP; and
a third module that maintains the current or default DAP when the serving AP resource cost is higher than the DAP resource cost, and establishes the serving AP as the DAP when the serving AP resource cost is lower than the DAP resource cost and when a difference between the serving AP resource cost and the DAP resource cost is greater than a switching overhead cost.

23. A non-transitory computer-readable medium, comprising:
computer-readable instructions configured to determine a data attachment point (DAP) for a wireless access network (AN), the instructions are executable by at least one computer to:
establish a resource cost for at least two wireless access points (AP) of the wireless AN with respect to each of multiple AGWs;
compare a resource cost of a serving AP, the serving AP coupled to an access terminal (AT) to facilitate wireless communication between the AT and one or more networks, to a resource cost of a current or default DAP, the current or default DAP being an AP to which an AGW routes downlink data packets for the AT and that tunnels the downlink data packets to the serving AP;

maintain the current or default DAP when the serving AP resource cost is higher than the DAP resource cost; and
establish the serving AP as the DAP when the serving AP resource cost is lower than the DAP resource cost and when a difference between the serving AP resource cost and the DAP resource cost is greater than a switching overhead cost.

24. A method for facilitating selection of a data attachment point (DAP) for a wireless access network (AN), comprising:
registering for data communication with a wireless access point (AP) of the wireless AN, the wireless AP providing wireless communication between an access terminal (AT) and one or more networks;
obtaining a cost metric associated with the wireless AP with respect to each of multiple access gateways (AGWs);
obtaining a cost metric of a current or default DAP, the current or default DAP being an AP to which an AGW routes downlink data packets for the AT and that tunnels the downlink data packets to the wireless AP;
comparing the cost metric of the wireless AP with the cost metric of the current or default DAP;
maintaining the current or default DAP when the wireless AP cost metric is higher than the DAP resource cost; and
establishing the wireless AP as the DAP when the wireless AP cost metric is lower than the DAP cost metric and when a difference between the serving AP resource cost and the DAP resource cost is greater than a switching overhead cost.

25. The method of claim 24, further comprising receiving cost metrics of each AP of the wireless AN.

26. The method of claim 24, further comprising forwarding a result of the comparison to the wireless AP if the cost metric of the AP is lower than the cost metric of the current or default DAP.

27. The method of claim 24, further comprising:
obtaining a plurality of cost metrics of the wireless AP for a data interface of each of multiple data network gateways, each of the multiple data network gateways providing a different path to the multiple AGWs;
identifying which of the data interface provides the lowest cost metric for the wireless AP;
obtaining a cost metric for the DAP relative to the identified data interface;
comparing the lowest cost metric and the DAP cost metric; and
forwarding a result of the comparison to the AP if the lowest cost metric is less than the DAP cost metric.

28. An access terminal (AT) that facilitates selection of a data attachment point (DAP) for a wireless access network (AN), comprising:
a controller that registers for data communication with a wireless access point (AP) of the wireless AN, the wireless AP providing wireless communication between the AT and one or more networks; and
a receive circuit that obtains a cost metric associated with the wireless AP with respect to each of multiple AGWs;
wherein the receive circuit obtains a cost metric of a current or default DAP, the current or default DAP being an AP to which an AGW routes downlink data packets for the AT and that tunnels the downlink data packets to the wireless AP, and wherein the AT further comprises:
a processing circuit that is configured to compare the cost metric of the wireless AP with the cost metric of the current or default DAP, maintain the current or default DAP when the wireless AP cost metric is higher than the DAP cost metric, and establish the wireless AP as the DAP when the wireless AP cost metric is lower than the DAP cost metric and when a difference between the serving AP resource cost and the DAP resource cost is greater than a switching overhead cost.

29. The AT of claim 28, wherein the receive circuit is configured to obtain cost metrics of each AP of the wireless AN and the controller is configured to process the cost metrics relative each other.

30. The AT of claim 28, further comprising a transmit circuit configured to forward a result of the comparison to the wireless AP if the cost metric of the AP is lower than the cost metric of the current or default DAP.

31. The AT of claim 28, wherein:
the receive circuit obtains a plurality of cost metrics of the wireless AP for a data interface of each of multiple IP gateways, each of the multiple IP gateways providing a different path to the multiple AGWs;
the processing circuit identifies which data interface provides the lowest cost metric for the wireless AP;
the receive circuit obtains a cost metric for the DAP relative to the identified data interface;
the processing circuit compares the lowest cost metric and the DAP cost metric; and
the transmit circuit forwards the result of the comparison to the AP if the lowest cost metric is less than the DAP cost metric.

32. An apparatus configured to facilitate selection of a data attachment point (DAP) in a wireless access network (AN), comprising:
means for registering for data communication with a wireless access point (AP) of the wireless AN, the wireless AP providing wireless communication between an access terminal (AT) and one or more networks;
means for obtaining a cost metric associated with the wireless AP with respect to each of multiple AGWs;
means for obtaining a cost metric of a current or default DAP, the current or default DAP being an AP to which an AGW routes downlink data packets for the AT and that tunnels the downlink data packets to the wireless AP;
means for comparing the cost metric of the wireless AP with the cost metric of the current or default DAP;
means for maintaining the current or default DAP when the wireless AP cost metric is higher than the DAP cost metric; and
means for establishing the wireless AP as the DAP when the wireless AP cost metric is lower than the DAP cost metric and when a difference between the serving AP resource cost and the DAP resource cost is greater than a switching overhead cost.

33. A processor configured to facilitate selection of a data attachment point (DAP) in a wireless access network (AN), comprising:
a first module that registers for data communication with a wireless access point (AP) of the wireless AN, the wireless AP providing wireless communication between an access terminal (AT) and one or more networks;
a second module that obtains a cost metric associated with the AP with respect to each of multiple AGWs; and
a third module that obtains a cost metric of a current or default DAP, the current or default DAP being an AP to which an AGW routes downlink data packets for the AT and that tunnels the downlink data packets to the wireless AP;
a fourth module that compares the cost metric of the wireless AP with the cost metric of the current or default DAP;

a fifth module that maintains the current or default DAP when the wireless AP cost metric is higher than the DAP cost metric; and a sixth module that establishes the wireless AP as the DAP when the wireless AP cost metric is lower than the DAP cost metric and when a difference between the serving AP resource cost and the DAP resource cost is greater than a switching overhead cost.

34. A non-transitory computer-readable medium, comprising:

computer-readable instructions configured to facilitate selection of a data attachment point (DAP) in a wireless access network (AN), the instructions are executable by at least one computer to:

register for data communication with a wireless access point (AP) of the wireless AN, the wireless AP providing wireless communication between an access terminal (AT) and one or more networks;

obtain a cost metric associated with the wireless AP with respect to each of multiple AGWs;

obtain a cost metric of a current or default DAP, the current or default DAP being an AP to which an AGW routes downlink data packets for the AT and that tunnels the downlink data packets to the wireless AP;

compare the cost metric of the wireless AP with the cost metric of the current or default DAP;

maintain the current or default DAP when the wireless AP cost metric is higher than the DAP cost metric; and establish the wireless AP as the DAP when the wireless AP cost metric is lower than the DAP cost metric and when a difference between the serving AP resource cost and the DAP resource cost is greater than a switching overhead cost.

* * * * *